US008850365B2

(12) United States Patent  
Cumming

(10) Patent No.: US 8,850,365 B2  
(45) Date of Patent: Sep. 30, 2014

(54) METHOD AND HANDHELD ELECTRONIC DEVICE FOR TRIGGERING ADVERTISING ON A DISPLAY SCREEN

(75) Inventor: Joel Cumming, Waterloo (CA)

(73) Assignee: BlackBerry Limited (CA)

( * ) Notice: Subject to any disclaimer, the term of this patent is extended or adjusted under 35 U.S.C. 154(b) by 540 days.

(21) Appl. No.: 12/394,136

(22) Filed: Feb. 27, 2009

(65) Prior Publication Data

US 2010/0222046 A1 Sep. 2, 2010

(51) Int. Cl.
| | |
|---|---|
| G06F 3/14 | (2006.01) |
| H04M 1/00 | (2006.01) |
| G01C 9/00 | (2006.01) |
| G06Q 30/00 | (2012.01) |
| G06Q 10/00 | (2012.01) |
| H04M 3/487 | (2006.01) |
| H04M 1/725 | (2006.01) |
| G06Q 30/02 | (2012.01) |

(52) U.S. Cl.
CPC ........ *H04M 3/4878* (2013.01); *H04M 1/72563* (2013.01); *G06Q 30/02* (2013.01)
USPC ....... 715/864; 455/575.4; 702/150; 705/14.4; 705/319

(58) Field of Classification Search
USPC ............ 715/864, 716; 705/14.69, 14.68, 319; 345/659; 702/150; 455/575.4
See application file for complete search history.

(56) References Cited

U.S. PATENT DOCUMENTS

| | | | |
|---|---|---|---|
| 6,363,419 B1 * | 3/2002 | Martin et al. ................. | 709/219 |
| 6,785,711 B1 * | 8/2004 | Motoyama et al. ........... | 709/206 |
| 6,850,226 B2 * | 2/2005 | Finke-Anlauff .............. | 345/169 |
| 6,862,445 B1 * | 3/2005 | Cohen ........................ | 455/412.1 |
| 7,154,383 B2 | 12/2006 | Berquist | |
| 7,162,226 B2 * | 1/2007 | Papulov ..................... | 455/414.3 |
| 7,251,476 B2 * | 7/2007 | Cortegiano ................ | 455/412.1 |
| 2002/0032608 A1 * | 3/2002 | Kanter ............................ | 705/14 |
| 2003/0096625 A1 * | 5/2003 | Lee et al. ..................... | 455/466 |
| 2004/0259599 A1 * | 12/2004 | Okawa .......................... | 455/567 |

(Continued)

FOREIGN PATENT DOCUMENTS

| | | |
|---|---|---|
| CN | 1551606 A | 12/2004 |
| CN | 101079905 A | 11/2007 |

(Continued)

OTHER PUBLICATIONS

Corresponding EP patent application No. 09154034.4 ESR dated Jul. 10, 2009.

(Continued)

*Primary Examiner* — Nicholas Ulrich
(74) *Attorney, Agent, or Firm* — Schwegman Lundberg & Woessner, P.A.

(57) ABSTRACT

A method and handheld electronic device for triggering the display of content on a display screen are provided. In accordance with one embodiment, there is provided a method of triggering the display of content on a display screen of a handheld electronic device, the method comprising: monitoring for the occurrence of trigger conditions comprising one or more of: inputs to change an operational mode of the handheld electronic device, changes in orientation of the handheld electronic device, or changes in a screen orientation of a graphical user interface (GUI) displayed on the display screen; and reproducing content on the handheld electronic device in response to detection of one of the trigger conditions.

20 Claims, 7 Drawing Sheets

(56) References Cited

U.S. PATENT DOCUMENTS

| | | | |
|---|---|---|---|
| 2006/0217110 A1 | 9/2006 | Othmer | |
| 2006/0277474 A1* | 12/2006 | Robarts et al. | 715/745 |
| 2007/0255693 A1* | 11/2007 | Ramaswamy et al. | 707/3 |
| 2008/0139306 A1* | 6/2008 | Lutnick et al. | 463/30 |
| 2008/0165152 A1 | 7/2008 | Forstall et al. | |
| 2008/0280642 A1* | 11/2008 | Coxhill et al. | 455/556.1 |
| 2009/0005071 A1* | 1/2009 | Forstall et al. | 455/456.1 |
| 2009/0037270 A1* | 2/2009 | Patro | 705/14 |
| 2009/0106104 A1* | 4/2009 | Upendran et al. | 705/14 |
| 2009/0171748 A1* | 7/2009 | Aven et al. | 705/10 |
| 2010/0035656 A1* | 2/2010 | Pan | 455/566 |
| 2010/0094689 A1* | 4/2010 | Fodor | 705/14.1 |
| 2010/0185674 A1* | 7/2010 | Jobs et al. | 707/781 |

FOREIGN PATENT DOCUMENTS

| | | |
|---|---|---|
| CN | 101099192 A | 1/2008 |
| EP | 1477918 A2 | 11/2004 |
| EP | 1993269 | 3/2008 |
| EP | 1 983 730 A | 10/2008 |
| WO | WO-2006073020 A1 | 7/2006 |
| WO | 2007/036595 | 4/2007 |
| WO | WO-2009023591 A2 | 2/2009 |

OTHER PUBLICATIONS

Communication from the European Patent Office dated Apr. 12, 2011 for corresponding European Patent Application No. 10186302.5.
Extended European Search Report dated Jan. 12, 2011.
"Pre Roll Ads—die Zukunft der Werbung?", Online Media Trends, 3 pages, with English translation.
Canadian Application Serial No. 2,694,714, Office Action mailed Oct. 22, 2012, 4 pgs.
Chinese Application Serial No. 201010173002.2, Office Action mailed Jan. 29, 2012, With English Translation, 19 pgs.
Chinese Application Serial No. 201010173002.2, Office Action mailed Oct. 26, 2012, With English Translation, 8 pgs.
Chinese Application Serial No. 201010173002.2, Response filed Jan. 9, 2013 to Office Action mailed Oct. 26, 2012, With English Claims, 9 pgs.
Chinese Application Serial No. 201010173002.2, Response filed Jun. 13, 2012 to Office Action mailed Jan. 29, 2012, English Claims with response, 14 pgs.
European Application Serial No. 09154034.4, Office Action mailed Mar. 31, 2010, 7 pgs.
European Application Serial No. 09154034.4, Office Action mailed Jul. 1, 2010, 5 pgs.
European Application Serial No. 09154034.4, Office Action mailed Nov. 16, 2009, 4 pgs.
European Application Serial No. 09154034.4, Response filed Jan. 5, 2010 to Office Action mailed Nov. 16, 2009, 13 pgs.
European Application Serial No. 09154034.4, Response filed Jun. 4, 2010 to Office Action mailed Mar. 31, 2010, 27 pgs.
European Application Serial No. 09154034.4, Response filed Jul. 8, 2010 to Office Action mailed Jul. 14, 2010, 2 pgs.
European Application Serial No. 09154034.4, Response filed Sep. 17, 2009 to European Search Report mailed Jul. 10, 2009, 15 pgs.
European Application Serial No. 10186302.5, Response filed Aug. 16, 2011 to Office Action mailed Apr. 12, 2011, 2 pgs.
Canadian Application Serial No. 2,694,714, Office Action mailed Nov. 25, 2013, 5 pgs.
Canadian Application Serial No. 2,694,714, Response filed Apr. 30, 2014 to Office Action mailed Nov. 25, 2013, 18 pgs.
Canadian Application Serial No. 2,694,714, Response filed Apr. 18, 2013 to Office Action mailed Oct. 22, 2012, 15 pgs.
Chinese Application Serial No. 201010173002.2, Office Action mailed Feb. 8, 2014, w/English translation, 30 pgs.
Chinese Application Serial No. 201010173002.2, Office Action mailed Mar. 13, 2013, w/English translation, 12 pgs.
Chinese Application Serial No. 201010173002.2, Office Action mailed Aug. 7, 2013, w/English translation, 25 pgs.
Chinese Application Serial No. 201010173002.2, Response filed May 28, 2013 to Office Action mailed Mar. 13, 2013, w/English claims, 9 pgs.
Chinese Application Serial No. 201010173002.2, Response filed Dec. 20, 2013 to Office Action mailed Aug. 7, 2013, w/English claims, 12 pgs.
European Application Serial No. 09154034.4, Office Action mailed Aug. 3, 2010, 13 pgs.
European Application Serial No. 10186302.5, Amendment filed Mar. 23, 2011, 13 pgs.

* cited by examiner

Top up Device Orientation

Bottom up Device Orientation

Left up Device Orientation

Right up Device Orientation

Front up Device Orientation

Back up Device Orientation

METHOD AND HANDHELD ELECTRONIC DEVICE FOR TRIGGERING ADVERTISING ON A DISPLAY SCREEN

TECHNICAL FIELD

The present disclosure relates generally to mechanisms for triggering the display of content on the display screen of a handheld electronic device, and more particularly to a method and handheld electronic device for triggering advertising on a display screen.

BACKGROUND

Content displayed on the display screen of a handheld electronic device may require or benefit from the attention of the user. However, existing solutions do not provide adequate mechanisms for ensuring or increasing the likelihood that the user's attention will be focussed on the display screen of the handheld electronic device at any time during the display of content. Thus, there remains a need for improved mechanisms for triggering the display of content on the display screen of a handheld electronic device.

BRIEF DESCRIPTION OF THE DRAWINGS

Like reference numerals are used in the drawings to denote like elements and features.

DETAILED DESCRIPTION OF EXAMPLE EMBODIMENTS

Figure 1:
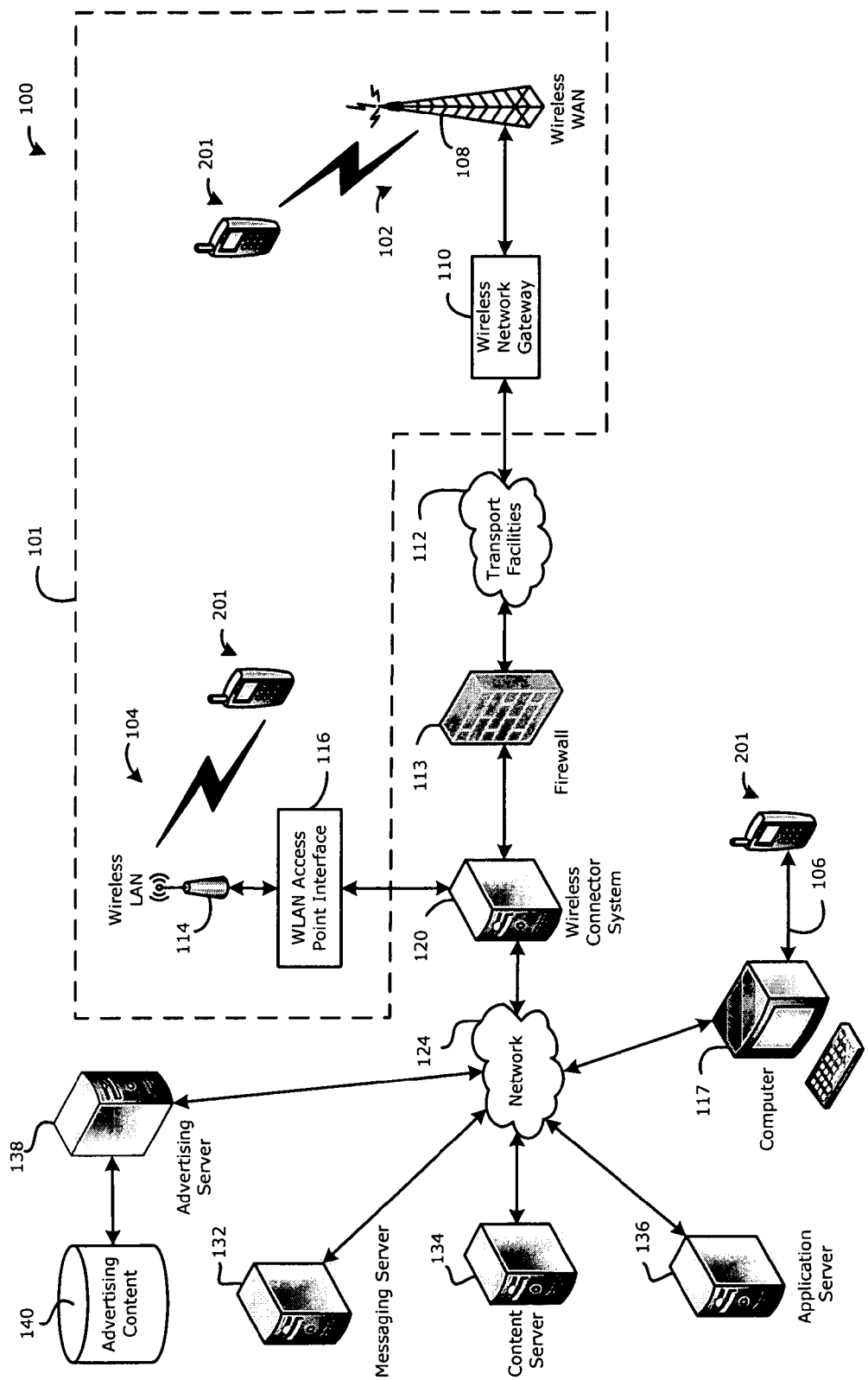
FIG. 1 is a block diagram illustrating a communication system including a mobile communication device to which example embodiments of the present disclosure can be applied.

The embodiments described herein generally relate to portable electronic devices. Examples of portable electronic devices include mobile (wireless) communication devices such as pagers, cellular phones, Global Positioning System (GPS) navigation devices and other satellite navigation devices, smartphones, wireless organizers, personal digital assistants (PDAs) and wireless-enabled notebook computers. At least some of these portable electronic devices may be handheld electronic devices. The portable electronic device may be a portable electronic device without wireless communication capabilities such as a PDA, handheld electronic game device, digital photograph album or picture frame, digital camera, and digital video recorder such as a camcorder. The portable electronic devices may have a touchscreen display or conventional non-touchscreen display. The portable electronic devices could have a touchscreen display as well as a mechanical keyboard. These examples are intended to be non-limiting.

The present disclosure provides a method and handheld electronic device which detects the occurrence of one or more trigger conditions (also referred to as trigger events) which are suitable for displaying an advertisement, and then displays an advertisement on the display of the handheld electronic device. The trigger conditions may be changes in the screen orientation of the handheld electronic device, changes in the orientation of the handheld electronic device itself, or a change in the mode of the handheld electronic device (e.g., when starting a new application or switching between applications on the handheld electronic device). To further increase the likelihood that the user will view the advertisement, a termination condition such as a delay or predetermined input may be required in order to end the display of the advertisement and to resume normal operation of the handheld electronic device. Prior to the occurrence of the termination condition, depending on the embodiment, the handheld electronic device may be placed in a locked mode in which user input is limited.

In accordance with one embodiment of the present disclosure, there is provided a method of triggering the display of content on a display screen of a handheld electronic device, the method comprising: monitoring for the occurrence of trigger conditions comprising one or more of: inputs to change an operational mode of the handheld electronic device, changes in orientation of the handheld electronic device, or changes in a screen orientation of a graphical user interface (GUI) displayed on the display screen; and reproducing content on the handheld electronic device in response to detection of one of the trigger conditions.

In accordance with another embodiment of the present disclosure, there is provided a handheld electronic device, comprising: a controller for controlling the operation of the device; one or more input devices connected to the controller; a display screen connected to the controller; and the controller being configured to: monitor for the occurrence of trigger conditions comprising one or more of: inputs to change an operational mode of the handheld electronic device, changes in orientation of the handheld electronic device, or changes in a screen orientation of a graphical user interface (GUI) displayed on the display screen; and reproduce content on the handheld electronic device in response to detection of one of the trigger conditions.

In accordance with a further embodiment of the present disclosure, there is provided a computer program product comprising a computer readable medium having stored thereon computer program instructions for implementing a method on a handheld electronic device for triggering the display of content on a display screen, the computer executable instructions comprising instructions for performing the method(s) set forth above.

Communication System Configuration

In order to facilitate an understanding of one possible environment in which example embodiments described herein can operate, reference is first made to FIG. 1 which shows in block diagram form a communication system 100 in which example embodiments of the present disclosure can be applied. The communication system 100 comprises a number of mobile communication devices 201 which may be connected to the remainder of system 100 in any of several different ways. Accordingly, several instances of mobile communication devices 201 are depicted in FIG. 1 employing different example ways of connecting to system 100. Mobile communication devices 201 are connected to a wireless network 101 which may comprise one or more of a Wireless Wide Area Network (WWAN) 102 and a Wireless Local Area Network (WLAN) 104 or other suitable network arrangements. In some embodiments, the mobile communication devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSDPA (High-Speed Downlink Packet Access), IEEE 802.16e (also referred to as Worldwide Interoperability for Microwave Access or "WiMAX"), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 which connects the mobile communication devices 201 to transport facilities 112, and through the transport facilities 112 to a wireless connector system 120. Transport facilities may include one or more private networks or lines, the public Internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some embodiments, the network 124 may be realised using the Internet rather than an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an Internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly via the transport facilities 112 if the access point 114 is a personal Wi-Fi network or Wi-Fi hotspot (in which case a mechanism for securely connecting to the wireless connector system 120, such as a virtual private network (VPN), may be required). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email communications, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange™, IBM Lotus Domino™, or Novell GroupWise™ email server), a content server 134 for providing content such as Internet content or content from an organization's internal servers and application servers 136 for implementing server-based applications such as instant messaging (IM) applications to mobile communication devices 201, and to an advertising server 138 which maintains and optionally selects advertisements for display on the mobile communication devices 201. An advertising content database 140 is maintained by or accessible to the advertising server 138 of the wireless network 101. The advertising server 138 could be omitted in other embodiments, for example if the content is stored on the device 201 and the content selection decision is made by the device 201, or if the content is provided by other components of the wireless network 101 (e.g., respective servers maintaining and/or accessing the respective content) such as the content server 134.

The wireless connector system 120 typically provides a secure exchange of data (e.g., email messages, personal information manager (PIM) data, and IM data) with the mobile communication devices 201. In some embodiments, communications between the wireless connector system 120 and the mobile communication devices 201 are encrypted. In some embodiments, communications are encrypted using a symmetric encryption key implemented using Advanced Encryption Standard (AES) or Triple Data Encryption Standard (Triple DES) encryption.

The wireless network gateway 110 is adapted to send data packets received from the mobile communication device 201 over the WWAN 102 to the wireless connector system 120. The wireless connector system 120 then sends the data packets to the appropriate connection point such as the messaging server 132, content server 134 or application servers 136. Conversely, the wireless connector system 120 sends data packets received, for example, from the messaging server 132, content server 134 or application servers 136 to the wireless network gateway 110 which then transmit the data packets to the destination mobile communication device 201. The AP interfaces 116 of the WLAN 104 provide similar sending functions between the mobile communication device 201, the wireless connector system 120 and network connection point such as the messaging server 132, content server 134 and application server 136.

The network 124 may comprise a private local area network, metropolitan area network, wide area network, the public Internet or combinations thereof and may include virtual networks constructed using any of these, alone, or in combination.

A mobile communication device 201 may alternatively connect to the wireless connector system 120 using a computer 117, such as desktop or notebook computer, via the network 124. A link 106 may be provided for exchanging information between the mobile communication device 201 and computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile communication device 201 and computer 117. The short-range wireless communication interface may be a personal area network (PAN) interface. A personal area network is a wireless point-to-point connection meaning no physical cables are required to connect the two end points. The short-range wireless communication interface may comprise one or a combination of an infrared (IR) connection such as an Infrared Data Association (IrDA) connection, a short-range radio frequency (RF) connection such as one specified by IEEE 802.15.1 or the Bluetooth™ special interest group, or IEEE 802.15.3a, also referred to as Ultra-Wideband (UWB), or other PAN connection.

It will be appreciated that the above-described communication system is provided for the purpose of illustration only, and that the above-described communication system comprises one possible communication network configuration of a multitude of possible configurations for use with the mobile communication devices 201. The teachings of the present disclosure may be employed in connection with any other type of network and associated devices that are effective in implementing or facilitating wireless communication. Suitable variations of the communication system will be understood to a person of skill in the art and are intended to fall within the scope of the present disclosure.

Mobile Communication Device

Figure 2:
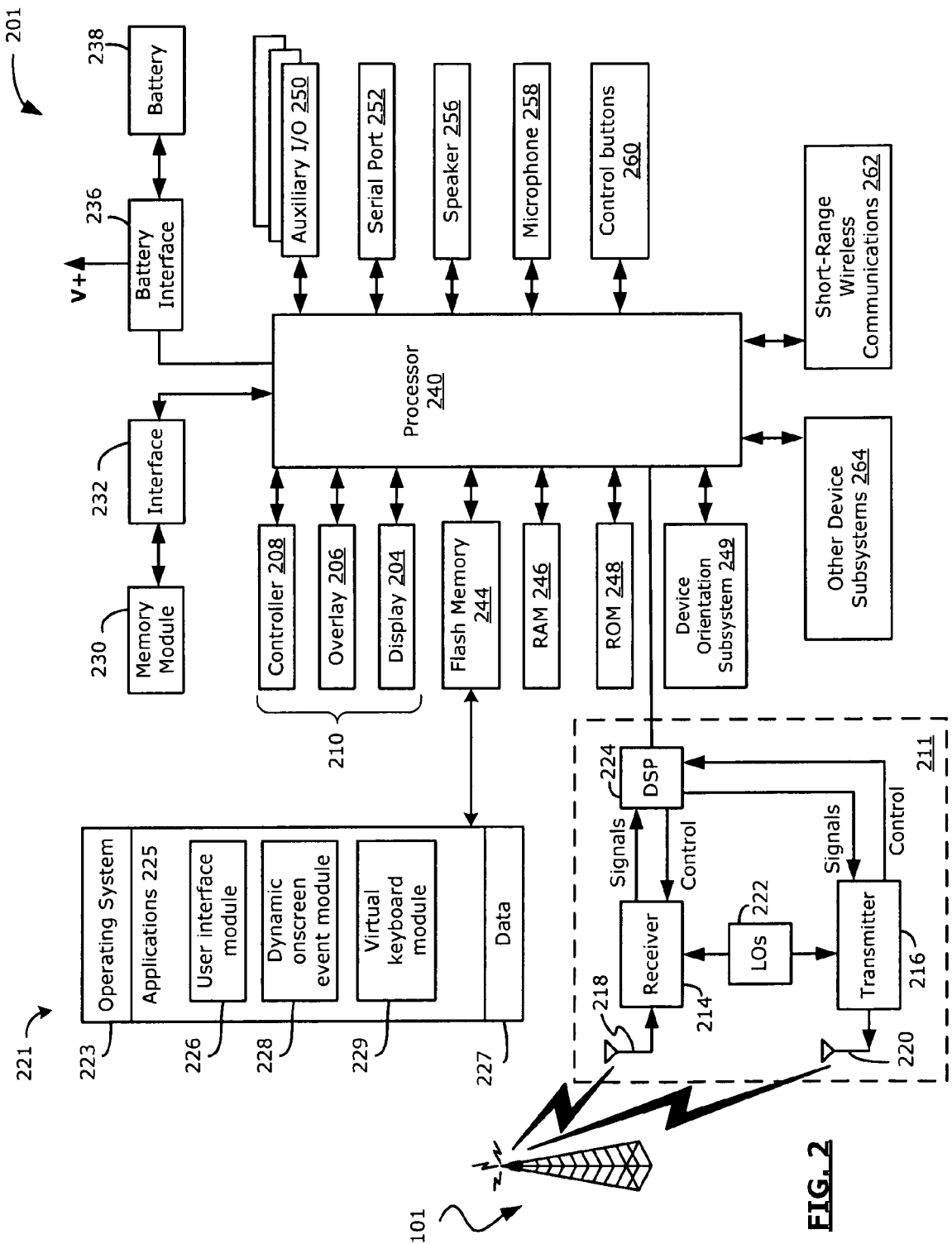
FIG. 2 is a block diagram illustrating a mobile communication device in accordance with one embodiment of the present disclosure.

Reference is now made to FIG. 2 which illustrates a mobile communication device 201 in which example embodiments described in the present disclosure can be applied. The mobile communication device 201 is a two-way communication device having at least data and possibly also voice communication capabilities, and the capability to communicate with other computer systems, for example, via the Internet. Depending on the functionality provided by the mobile communication device 201, in various embodiments the device may be a data communication device, a multiple-mode communication device configured for both data and voice communication, a smartphone, a mobile telephone or a PDA (personal digital assistant) enabled for wireless communication, or a computer system with a wireless modem.

The mobile communication device 201 includes a controller comprising at least one processor 240 such as a microprocessor which controls the overall operation of the mobile communication device 201. The processor 240 interacts with device subsystems including a communication subsystem 211 which performs communication functions and exchanges radio frequency signals with the wireless network 101, a display (screen) 204 such as a liquid crystal display (LCD) screen which defines a viewing area, and a touch-sensitive input surface or overlay 206 connected to an electronic controller 208 that together make up a touchscreen display 210. The touch-sensitive input surface/overlay 206 may comprise a protective lens or transparent protective material. The touch-sensitive overlay 206 and the electronic controller 208 provide a touch-sensitive input device and the processor 240 interacts with the touch-sensitive overlay 206 via the electronic controller 208.

The processor 240 also interacts with other device subsystems including flash memory 244, random access memory (RAM) 246, read only memory (ROM) 248, auxiliary input/output (I/O) subsystems 250, data port 252 such as serial data port (for example, a Universal Serial Bus (USB) data port), speaker 256, microphone 258, control keys 260, short-range communication subsystem 262, and other device subsystems generally designated as 264. Some of the subsystems shown in FIG. 2 perform communication-related functions, whereas other subsystems may provide "resident" or on-device functions.

The communication subsystem 211 includes a receiver 214, a transmitter 216, and associated components, such as one or more antenna elements 218 and 220, local oscillators (LOs) 222, and a processing module such as a digital signal processor (DSP) 224. The antenna elements 218 and 220 may be embedded or internal to the mobile communication device 201 and a single antenna may be shared by both receiver and transmitter, as is known in the art. As will be apparent to those skilled in the field of communication, the particular design of the wireless communication subsystem 211 depends on the wireless network 101 in which mobile communication device 201 is intended to operate.

The mobile communication device 201 may communicate with any one of a plurality of fixed transceiver base stations 108 of the wireless network 101 within its geographic coverage area. The mobile communication device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are input to the transmitter 216 for digital-to-analog (D/A) conversion, frequency up conversion, filtering, amplification, and transmission to the wireless network 101 via the antenna 220. The DSP 224 not only processes communication signals, but may also provide for receiver and transmitter control. For example, the gains applied to communication signals in the receiver 214 and the transmitter 216 may be adaptively controlled through automatic gain control algorithms implemented in the DSP 224.

The processor 240 operates under stored program control and executes software modules 221 stored in memory such as persistent memory, for example, in the flash memory 244. The software modules 221 comprise operating system software 223, software applications 225, a user interface module 226, dynamic event module 228, and a virtual keyboard module 229. The user interface module 226 renders and displays the GUI of the device 201 in accordance with instructions of the operating system 223 and applications 225 (as applicable). The virtual keyboard module 229 implements a virtual keyboard on the touchscreen display 210.

The dynamic event module 228 is a device application which renders/reproduces content such as an advertisement on the touchscreen display 210. In at least some embodiments, the device application is an advertising player which renders advertisements comprising video, animation, (e.g. Flash), a digital image, text document, audio, or other multimedia format comprising visual and audio content on the touchscreen display 210. The dynamic event module 228, in at least some embodiments, also enables the mobile communication device 201 to communicate with advertising server 138.

The user interface module 226, dynamic event module 228, and virtual keyboard module 229 may, among other things, be implemented through a stand-alone software application, or combined together in one or more of the operating system 223 and applications 225. In some example embodiments, the functions performed by each of the user interface module 226, dynamic event module 228, and virtual keyboard module 229 may be realized as a plurality of independent elements, rather than single integrated elements, and any one or more of these elements may be implemented as parts of other software applications 225. Furthermore, in some embodiments, at least some of the functions performed by any one of the user interface module 226, dynamic event module 228, and virtual keyboard module 229 may be implemented in firmware of the device 201.

Those skilled in the art will appreciate that the software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely an example, and those skilled in the art will appreciate that a different assignment of functions to types of memory could also be used.

The software applications 225 may include a range of applications, including, for example, an address book application, a messaging application, a calendar application, and/or a notepad application. In some embodiments, the software applications 225 includes one or more of a Web browser application (i.e., for a Web-enabled mobile communication device), an email message application, a push content viewing application, a voice communication (i.e. telephony) application, a map application, and a media player application. Each of the software applications 225 may include layout information defining the placement of particular fields and graphic elements (e.g. text fields, input fields, icons, etc.) in the user interface (i.e. the display 204) according to the application.

Figure 3A:
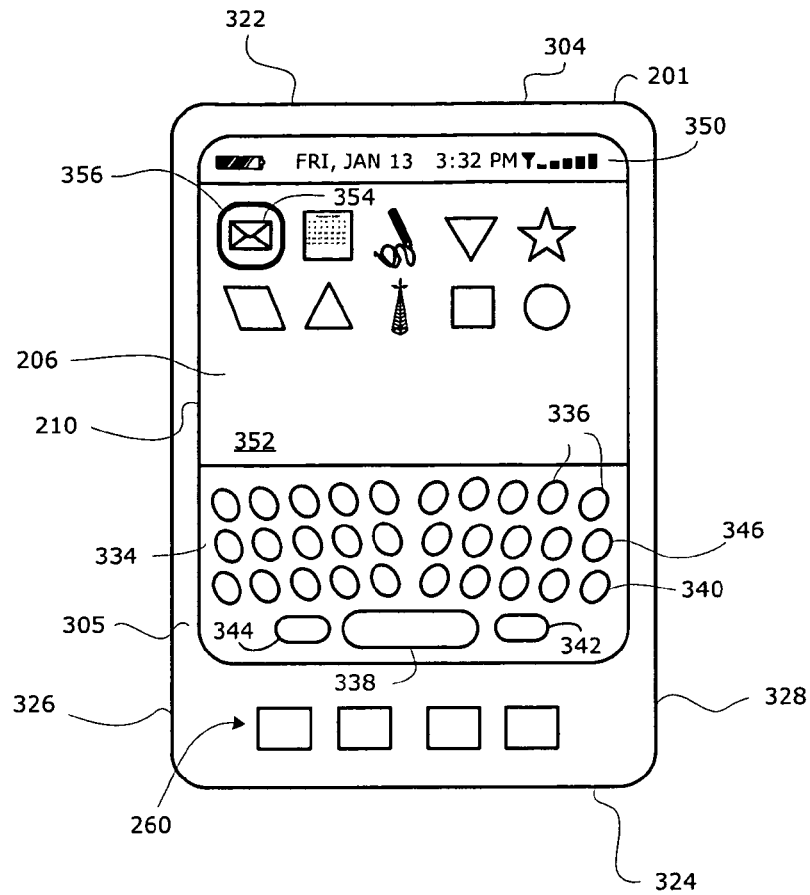
FIG. 3A illustrates a portrait screen orientation of a virtual keyboard in accordance with one embodiment of the present disclosure.
Figure 3B:
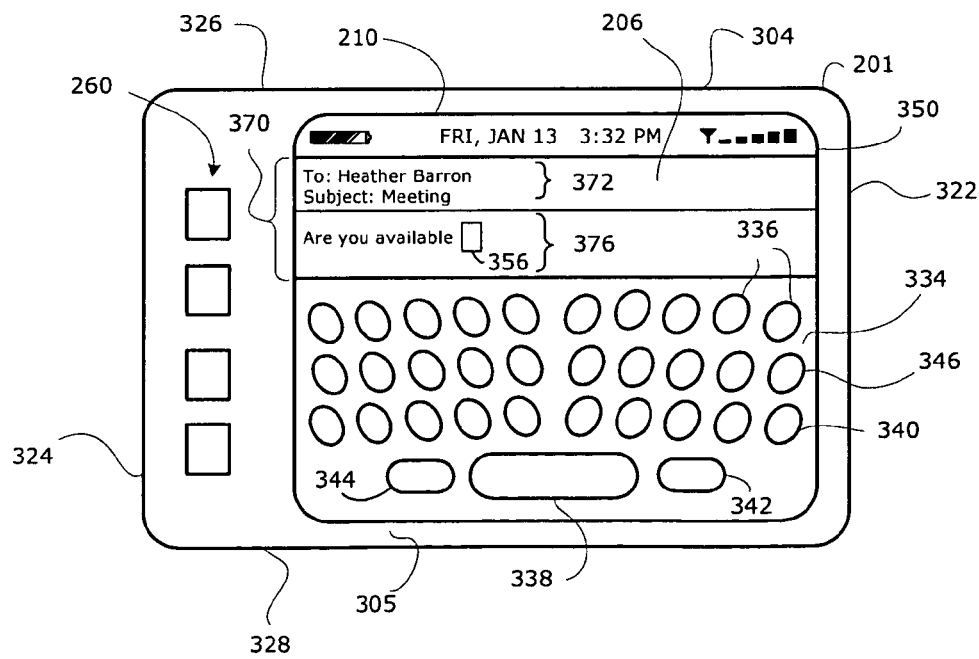
FIG. 3B illustrates a landscape screen orientation of a virtual keyboard in accordance with one example embodiment of the present disclosure.

Referring now to FIGS. 3A and 3B, the mobile communication device 201 includes a rigid case 304 for housing the components of the device 201 that is configured to be held in a user's hand while the device 201 is in use. The touchscreen display 210 is mounted within a front face 305 of the case 304. The case 304 has opposed top and bottom ends designated by references 322, 324 respectively, and left and right sides designated by references 326, 328 respectively which extend transverse to the top and bottom ends 322, 324. In the shown embodiments of FIGS. 3A and 3B, the case 304 (and device 201) is elongate having a length defined between the top and bottom ends 322, 324 longer than a width defined between the left and right sides 326, 328. Other device dimensions are also possible.

Although the case 304 is shown as a single unit it could, among other possible configurations, include two or more case members hinged together (such as a flip-phone configuration or a clam shell-style lap top computer, for example), or could be a "slider phone" in which the keyboard is located in a first body which is slide-ably connected to a second body which houses the display screen, the device being configured so that the first body which houses the keyboard can slide out from the second body for use. In other embodiments, the mobile communication device 201 could have a mechanical keyboard in addition to the touchscreen display 210.

Referring again to FIG. 2, in some embodiments, the auxiliary I/O subsystems 250 may comprise an external communication link or interface, for example, an Ethernet connection. The mobile communication device 201 may comprise other wireless communication interfaces for communicating with other types of wireless networks, for example, a wireless network such as an orthogonal frequency division multiplexed (OFDM) network or a GPS transceiver for communicating with a GPS satellite network (not shown). The auxiliary I/O subsystems 250 may comprise a navigational tool such as a clickable/depressible trackball or thumbwheel, or a vibrator for providing vibratory notifications in response to various events on the device 201 such as receipt of an electronic communication or incoming phone call, or for other purposes such as haptic feedback.

In some embodiments, the mobile communication device 201 also includes a removable memory card or module 230 (typically comprising flash memory) and a memory card interface 232. Network access is typically associated with a subscriber or user of the mobile communication device 201 via the memory card 230, which may be a Subscriber Identity Module (SIM) card for use in a GSM network or other type of memory card for use in the relevant wireless network type. The memory card 230 is inserted in or connected to the memory card interface 232 of the mobile communication device 201 in order to operate in conjunction with the wireless network 101.

The mobile communication device 201 stores data 227 in an erasable persistent memory, which in one example embodiment is the flash memory 244. In various embodiments, the data 227 includes service data comprising information required by the mobile communication device 201 to establish and maintain communication with the wireless network 101. The data 227 may also include user application data such as email messages, address book and contact information, calendar and schedule information, notepad documents, image files, and other commonly stored user information stored on the mobile communication device 201 by its user, and other data. The data 227 stored in the persistent memory (e.g. flash memory 244) of the mobile communication device 201 may be organized, at least partially, into a number of databases each containing data items of the same data type or associated with the same application. For example, email messages, contact records, and task items may be stored in individual databases within the device memory.

The serial data port 252 may be used for synchronization with a user's host computer system (not shown). The serial data port 252 enables a user to set preferences through an external device or software application and extends the capabilities of the mobile communication device 201 by providing for information or software downloads to the mobile communication device 201 other than through the wireless network 101. The alternate download path may, for example, be used to load an encryption key onto the mobile communication device 201 through a direct, reliable and trusted connection to thereby provide secure device communication.

In some embodiments, the mobile communication device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their mobile communication device 201 to the host computer system via a USB cable or Bluetooth® connection, traffic that was destined for the wireless network 101 is automatically routed to the mobile communication device 201 using the USB cable or Bluetooth® connection. Similarly, any traffic destined for the wireless network 101 is automatically sent over the USB cable Bluetooth® connection to the host computer system for processing.

The mobile communication device 201 also includes a battery 238 as a power source, which is typically one or more rechargeable batteries that may be charged, for example, through charging circuitry coupled to a battery interface 236 such as the serial data port 252. The battery 238 provides electrical power to at least some of the electrical circuitry in the mobile communication device 201, and the battery interface 236 provides a mechanical and electrical connection for the battery 238. The battery interface 236 is coupled to a regulator (not shown) which provides power V+ to the circuitry of the mobile communication device 201.

The short-range communication subsystem 262 is an additional optional component which provides for communication between the mobile communication device 201 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications will normally be installed on the mobile communication device 201 during or after manufacture. Additional applications and/or upgrades to the operating system 223 or software applications 225 may also be loaded onto the mobile communication device 201 through the wireless network 101, the auxiliary I/O subsystem 250, the serial port 252, the short-range communication subsystem 262, or other suitable subsystem 264, such as other wireless communication interfaces. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile communication device 201 and may provide enhanced on-device functions, communication-related functions, or both. For example, secure communication applications may enable electronic commerce functions and other such financial transactions to be performed using the mobile communication device 201.

The mobile communication device 201 may provide two principal modes of communication: a data communication mode and an optional voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email message application and output to the display 204. A user of the mobile communication device 201 may also compose data items, such as email messages, for example, using the touch-sensitive overlay 206 in conjunction with the display device 204 and possibly the control buttons 260 and/or the auxiliary I/O subsystems 250. These composed items may be transmitted through the communication subsystem 211 over the wireless network 101.

In the voice communication mode, the mobile communication device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the mobile communication device 201. Although voice or audio signal output is typically accomplished primarily through the speaker 256, the display device 204 may also be used to provide an indication of the identity of a calling party, duration of a voice call, or other voice call related information.

The touchscreen display 210 can be any suitable touchscreen display such as a capacitive touchscreen display. A capacitive touchscreen display 210 includes the display device 204 and the touch-sensitive overlay 206, in the form of a capacitive touch-sensitive overlay 206. It will be appreciated that the capacitive touch-sensitive overlay 206 includes a number of layers in a stack and is fixed to the display device 204 via a suitable optically clear adhesive. The layers can include, for example a substrate fixed to the display device 204 (e.g. LCD display) by a suitable adhesive, a ground shield layer, a barrier layer, a pair of capacitive touch sensor layers separated by a substrate or other barrier layer, and a cover layer fixed to the second capacitive touch sensor layer by a suitable adhesive. The capacitive touch sensor layers can be any suitable material such as patterned indium tin oxide (ITO).

Figure 4:
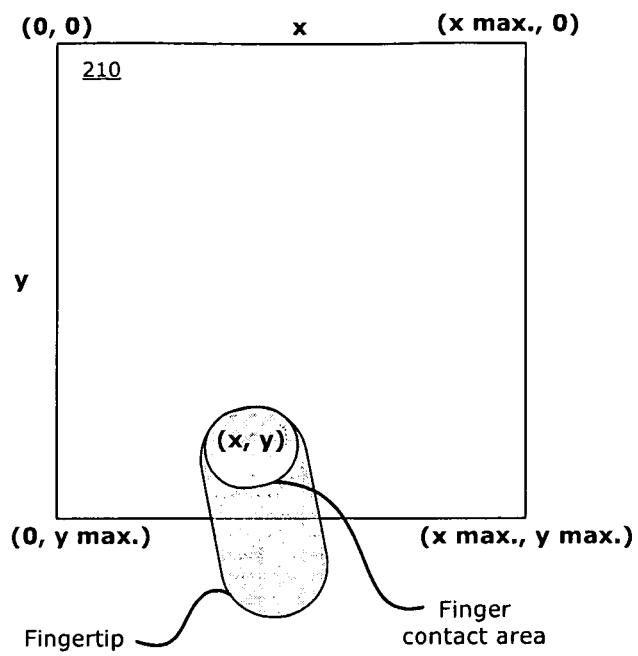
FIG. 4 illustrates a Cartesian dimensional coordinate system of a touchscreen which map locations of touch signals in accordance with one embodiment of the present disclosure.

Each of the touch sensor layers comprises an electrode layer each having a number of spaced apart transparent electrodes. The electrodes may be a patterned vapour-deposited ITO layer or ITO elements. The electrodes may be, for example, arranged in an array of spaced apart rows and columns. As shown in FIG. 4, the touch sensor layers/electrode layers are each associated with a coordinate (e.g., x or y) in a coordinate system used to map locations on the touchscreen display 210, for example, in Cartesian coordinates (e.g., x and y-axis coordinates). The intersection of the rows and columns of the electrodes may represent pixel elements defined in terms of an (x, y) location value which can form the basis for the coordinate system. Each of the touch sensor layers provide a signal to the controller 208 which represent the respective x and y coordinates of the touchscreen display 210. That is, x locations are provided by a signal generated by one of the touch sensor layers and y locations are provided by a signal generated by the other of the touch sensor layers.

The electrodes in the touch sensor layers/electrode layers respond to changes in the electric field caused by conductive objects in the proximity of the electrodes. When a conductive object is near or contacts the touch-sensitive overlay 206, the object draws away some of the charge of the electrodes and reduces its capacitance. The controller 208 receives signals from the touch sensor layers of the touch-sensitive overlay 206, detects touch inputs by determining changes in capacitance which exceed a predetermined threshold, and determines the centroid of a contact area defined by electrodes having a change in capacitance which exceeds the predetermined threshold, typically in x, y (Cartesian) coordinates.

The controller 208 sends the centroid of the contact area to the processor 240 of the device 201 as the location of the touch input detected by the touchscreen display 210. Depending on the touch-sensitive overlay 206 and/or configuration of the touchscreen display 210, the change in capacitance which results from the presence of a conductive object near the touch-sensitive overlay 206 but not contacting the touch-sensitive overlay 206, may exceed the predetermined threshold in which case the corresponding electrode would be included in the contact area. The detection of the presence of a conductive object such as a user's finger or a conductive stylus is sometimes referred to as finger presence/stylus presence.

It will be appreciated that other attributes of a touch input on the touchscreen display 210 can be determined. For example, the size and the shape (or profile) of the touch input on the touchscreen display 210 can be determined in addition to the location based on the signals received at the controller 208 from the touch sensor layers. For example, the touchscreen display 210 may be used to create a pixel image of the contact area created by a touch input. The pixel image is defined by the pixel elements represented by the intersection of electrodes in the touch sensor layers/electrode layers. The pixel image may be used, for example, to determine a shape or profile of the contact area.

The centroid of the contact area is calculated by the controller 208 based on raw location and magnitude (e.g., capacitance) data obtained from the contact area. The centroid is defined in Cartesian coordinates by the value $(X_c, Y_c)$. The centroid of the contact area is the weighted averaged of the pixels in the contact area and represents the central coordinate of the contact area. By way of example, the centroid may be found using the following equations:

$$X_c = \frac{\sum_{i=1}^{n} Z_i * x_i}{\sum_{i=1}^{n} Z_i} \quad (1)$$

$$Y_c = \frac{\sum_{i=1}^{n} Z_i * y_i}{\sum_{i=1}^{n} Z_i} \quad (2)$$

where $X_c$ represents the x-coordinate of the centroid of the contact area, $Y_c$ represents the y-coordinate of the centroid of the contact area, x represents the x-coordinate of each pixel in the contact area, y represents the y-coordinate of each pixel in the contact area, Z represents the magnitude (capacitance value) at each pixel in the contact area, the index i represents the electrodes in the contact area and n represents the number of electrodes in the contact area. Other methods of calculating the centroid will be understood to persons skilled in the art.

The controller 208 of the touchscreen display 210 is typically connected using both interpret and serial interface ports to the processor 240. In this way, an interrupt signal which indicates a touch input has been detected, the centroid of the contact area, as well as raw data regarding the location and magnitude of the activated electrodes in the contact area are passed to the processor 240. However, in other example embodiments only an interrupt signal which indicates a touch input has been detected and the centroid of the contact area are passed to the processor 240. In embodiments where the raw data is passed to the processor 240, the detection of a touch input and/or the determination of the centroid of the contact area may be performed by the processor 240 of the device 201 rather than the controller 208 of the touchscreen display 210.

In other embodiments, the touchscreen display 210 may be a display device, such as an LCD screen, having the touch-sensitive input surface (overlay) 206 integrated therein. One example of such a touchscreen is described in commonly owned U.S. patent publication no. 2004/0155991, published Aug. 12, 2004 (also identified as U.S. patent application Ser. No. 10/717,877, filed Nov. 20, 2003) which is incorporated herein by reference.

While a specific embodiment of the touchscreen display 210 has been described, any suitable type of touchscreen in the handheld electronic device of the present disclosure including, but not limited to, a capacitive touchscreen, a resistive touchscreen, a surface acoustic wave (SAW) touchscreen, an embedded photo cell touchscreen, an infrared (IR) touchscreen, a strain gauge-based touchscreen, an optical imaging touchscreen, a dispersive signal technology touchscreen, an acoustic pulse recognition touchscreen or a frustrated total internal reflection touchscreen. The type of touchscreen technology used in any given embodiment will depend on the handheld electronic device and its particular application and demands.

Referring again to FIG. 4, a Cartesian (two dimensional) coordinate system used to map locations of the touchscreen display 210 in accordance with one embodiment of the present disclosure will be described. The touchscreen display 210 defines a Cartesian coordinate system defined by x and y-axes in the input plane of the touchscreen display 210. Each touch input on the touchscreen display 210 returns a touch point defined in terms of an (x, y) value. The returned touch point is typically the centroid of the contact area.

In the shown embodiment, the touchscreen display 210 has a rectangular touch-sensitive overlay 206; however, in other embodiments, the touch-sensitive overlay 206 could have a different shape such as a square shape. The rectangular touch-sensitive overlay 206 results in a screen which is divided into a rectangular array of pixels with positional values ranging from 0 to the maximum in each of the x and y-axes (x max. and y max. respectively). The x-axis extends in the same direction as the width of the device 201 and the touch-sensitive overlay 206. The y-axis extends in the same direction as the length of the device 201 and the touch-sensitive overlay 206. In the shown embodiment, the touchscreen 210 has a square shaped touch-sensitive input surface 206 and an 8-bit resolution which results in a screen which is divided into a 256×256 pixel square with positional values ranging from 0 to 255 in each of the x and y-axes. However, it will be appreciated that in other embodiments a resolution greater than or less than 8-bits could be used.

The coordinate system has an origin (0, 0) which is located at the top left-hand side of the touchscreen display 210. For purposes of convenience, the origin (0, 0) of the Cartesian coordinate system is located at this position in all of the embodiments described in the present disclosure. However, it will be appreciated that in other embodiments the origin (0, 0) could be located elsewhere such as at the bottom left-hand side of the touchscreen display 210, the top right-hand side of the touchscreen display 210, or the bottom right-hand side of the touchscreen display 210. The location of the origin (0, 0) could be configurable in other embodiments.

During operation, a graphical user interface (GUI) for controlling the operation of the device 201 is displaying on the touchscreen display 210. The GUI is rendered prior to display by the operating system 223 or an application 225 which causes the processor 240 to display content on the touchscreen display 210. The GUI of the device 201 has a screen orientation in which the text and user interface elements of the GUI are oriented for normal viewing. It will be appreciated that the screen orientation for normal viewing is independent of the language supported, that is the screen orientation for normal viewing is the same regardless of whether a row-oriented language or column-oriented language (such as Asian languages) is displayed within the GUI. Direction references in relation to the GUI, such as top, bottom, left, and right, are relative to the current screen orientation of the GUI rather than the device 201 or its case 304.

In embodiments in which the display screen is rectangular in shape, such as that shown in FIG. 4, the screen orientation is either portrait (vertical) or landscape (horizontal). A portrait screen orientation is a screen orientation in which the text and other user interface elements extend in a direction transverse (typically perpendicular) to the length (y-axis) of the display screen. A landscape screen orientation is a screen orientation in which the text and other user interface elements extend in a direction transverse (typically perpendicular) to the width (x-axis) of the display screen. In some embodiments, the GUI of the device 201 may change its screen orientation between a portrait screen orientation and landscape screen orientation in accordance with changes in device orientation, depending on the settings and/or operational mode of the device 201. In other embodiments, the screen orientation of the device 201 may be fixed. In yet other embodiments in which the display screen is relatively square in shape, the screen orientation changes based on device orientation so that is oriented for normal viewing for the user, however, the aspect ratio does not change since the dimensions of the screen are substantially symmetrical.

The mobile communication device 201 also comprises a device orientation subsystem 249 (shown in FIG. 2) comprising at least one sensor which is connected to the processor 240 and which is controlled by one or a combination of a monitoring circuit and operating software. The sensor detects the orientation of the device 201 or information from which the orientation of the device 201 can be determined, such as acceleration. In some embodiments, the sensor is a three-axis accelerometer. In other embodiments, an orientation sensor other than an accelerometer could be used such as a gravity sensor, a gyroscope, a tilt sensor, an electronic compass or other suitable sensor, or combinations thereof. In some embodiments, the device orientation subsystem 249 may comprise two or more sensors such as an accelerometer and an electronic compass.

As will be appreciated by persons skilled in the art, an accelerometer is a sensor which converts acceleration from motion (e.g. movement of the device 201 or a portion thereof due to the strike force) and gravity which are detected by a sensing element into an electrical signal (producing a corresponding change in output) and is available in one, two or three axis configurations. Accelerometers may produce digital or analog output signals depending on the type of accelerometer. Generally, two types of outputs are available depending on whether an analog or digital accelerometer used: (1) an analog output requiring buffering and analog-to-digital (A/D) conversion; and (2) a digital output which is typically available in an industry standard interface such as an SPI (Serial Peripheral Interface) or I2C (Inter-Integrated Circuit) interface. The output of an accelerometer is typically measured in terms of the gravitational acceleration constant at the Earth's surface, denoted g, which is approximately 9.81 m/s$^2$ (32.2 ft/s$^2$) as the standard average. The accelerometer may be of almost any type including, but not limited to, a capacitive, piezoelectric, piezoresistive, or gas-based accelerometer. The range of accelerometers vary up to the thousands of g's, however for portable electronic devices "low-g" accelerometers may be used. Example low-g accelerometers which may be used are MEMS digital accelerometers from Analog Devices, Inc. (ADI), Freescale Semiconductor, Inc. (Freescale) and STMicroelectronics N.V. of Geneva, Switzerland.

Figure 5:
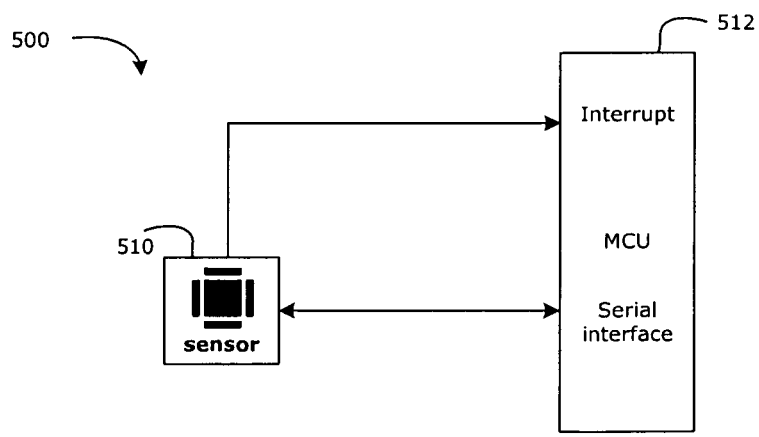
FIG. 5 is a block diagram of a device orientation detection subsystem comprising a digital 3-axis accelerometer in accordance with one example embodiment of the present disclosure.
Figure 6:
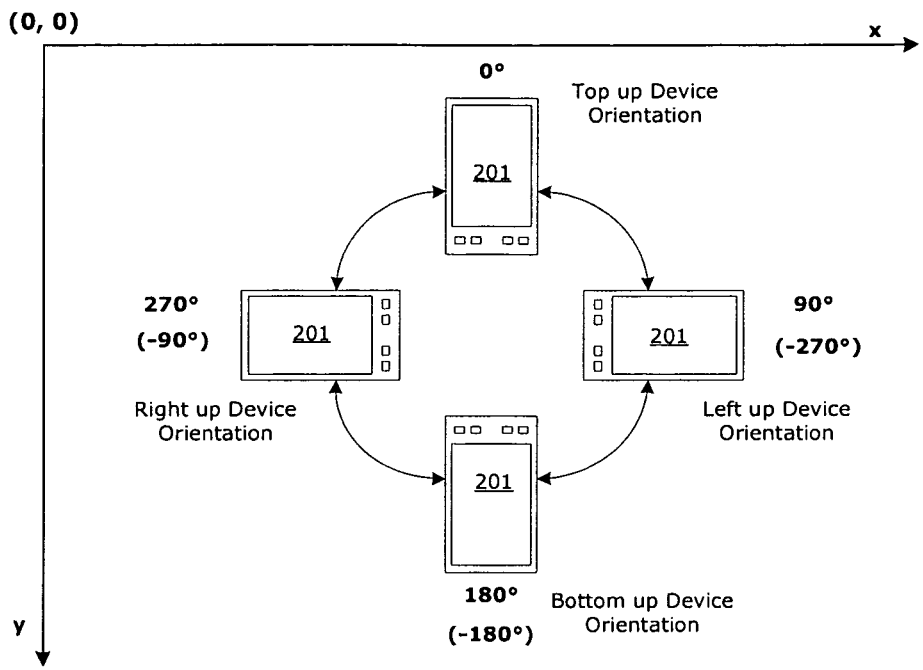
FIG. 6 illustrates relative orientations of a mobile communication device used in combination with a two dimensional coordinate system in accordance with one embodiment of the present disclosure.

Referring briefly to FIG. 5, a device orientation subsystem 249 in accordance with one example embodiment of the present disclosure will be described. The circuit 500 comprises a digital 3-axis accelerometer 510 connected to the interrupt and serial interface of a controller (MCU) 512. The controller 512 could be the processor 240 of the device 201. The operation of the controller 512 is controlled by software, which may be stored in internal memory of the controller 512. The operational settings of the accelerometer 510 are controlled by the controller 512 using control signals sent from the controller 512 to the accelerometer 510 via the serial interface. The controller 512 may determine the device orientation in accordance with the acceleration measured by the accelerometer 510, or raw acceleration data measured by the accelerometer 510 may be sent to the processor 240 of the device 201 via its serial interface where device orientation is determined by the operating system 223, or other software module 221. In other embodiments, a different digital accelerometer configuration could be used, or a suitable analog accelerometer and control circuit could be used.

Figure 7A:
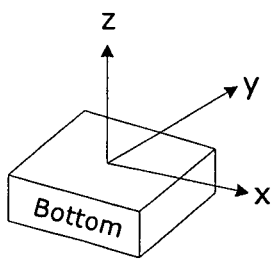
FIG. 7A to 7C are schematic diagrams illustrating the assignment of pitch and roll vectors of a three-axis sensor in accordance with one embodiment of the present disclosure.
Figure 7B:
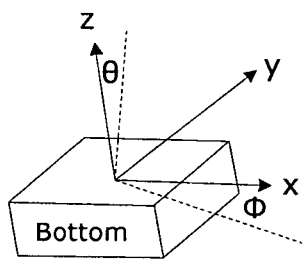
Figure 7C:
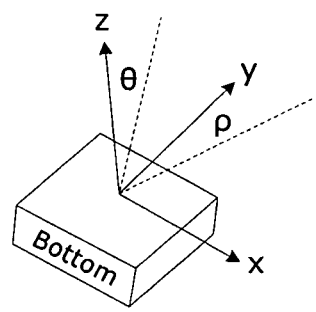

Referring now to FIGS. 7A to 7C, the assignment of pitch and roll vectors of a three-axis accelerometer in accordance with one example embodiment of the present disclosure will be briefly described. Each measurement axis is aligned with an axis of the mobile communication device 201. The x-axis and y-axis are typically aligned with the input plane of the touchscreen display 210. The z-axis is perpendicular to the horizontal plane and detects when the mobile communication device 201 is moved vertically.

As shown in FIG. 7B, pitch ($\phi$) is the angle of the x-axis relative to the ground. $\theta$ is the angle of the z-axis relative to gravity. As shown in FIG. 7C, roll (ρ) is the angle of the y-axis relative to the ground. It will be appreciated that rotation may occur about any combination of sensing axes. The concepts and methodology described herein can be applied to any axis orientation and any combination of pitch (φ) angle, roll (ρ) angle and θ (the angle of the z-axis relative to gravity). Pitch (φ), roll (ρ) and the angle of the z-axis relative to gravity (θ) of a three-axis accelerometer may be calculated using equations (3) (4) and (5):

$$\varphi = \arctan \frac{x_{sensor}}{\sqrt{y_{sensor}^2 + z_{sensor}^2}} \quad (3)$$

$$\rho = \arctan \frac{y_{sensor}}{\sqrt{x_{sensor1}^2 + z_{sensor}^2}} \quad (4)$$

$$\theta = \arctan \frac{\sqrt{x_{sensor}^2 + y_{sensor}^2}}{z_{sensor}} \quad (5)$$

where $x_{sensor}$, $y_{sensor}$ and $z_{sensor}$ are the measurements from the x, y and z-axes of the three-axis accelerometer. It will be appreciated that pitch (φ), roll (ρ) and the angle of the z-axis relative to gravity (θ) can also be determined by other means.

Triggering of Dynamic Events

Figure 9:
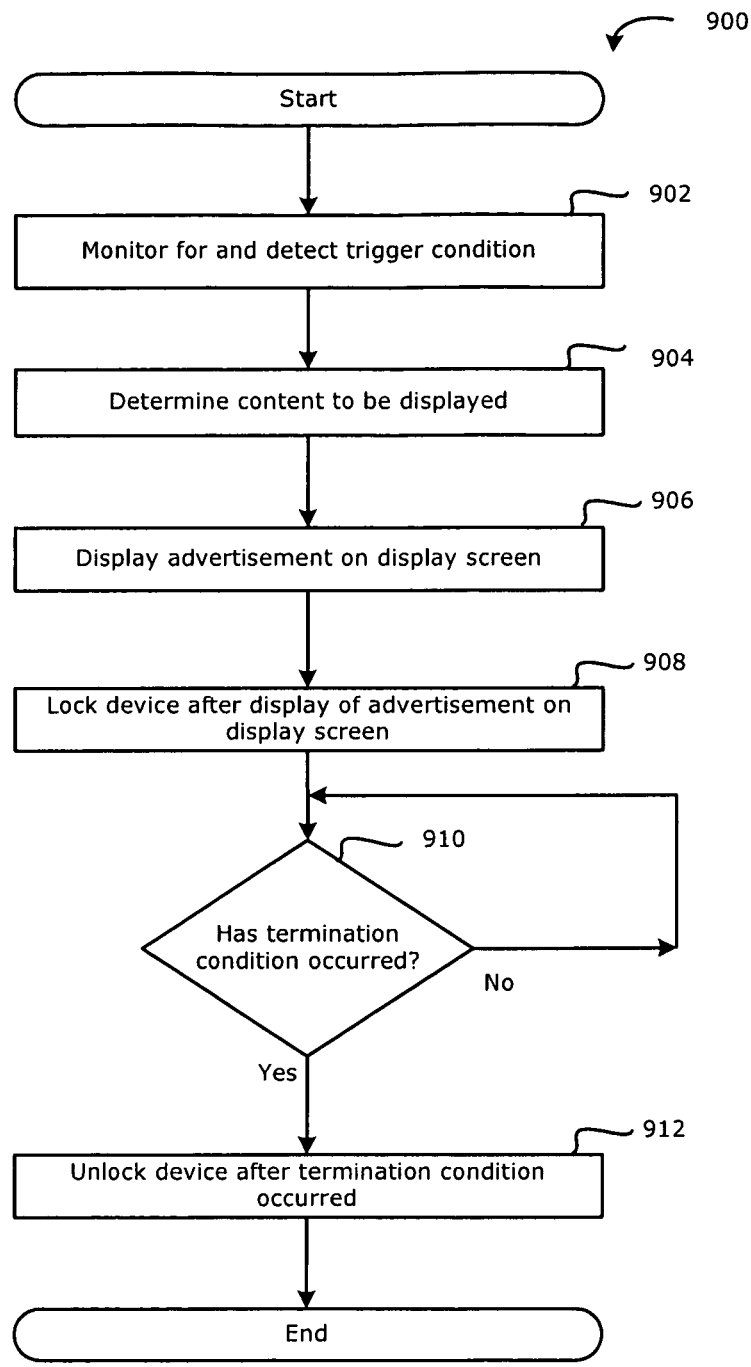
FIG. 9 is a flowchart illustrating example operations for displaying content in accordance with one example embodiment of the present disclosure.

Reference is now made to FIG. 9 which illustrates example operations 900 for triggering the display of content such as advertising on the touchscreen display 210 of the mobile communication device 201 in accordance with one embodiment of the present disclosure. The operations 900 are carried out by the processor 240 of the mobile communication device 201 under the instruction of the dynamic event module 228. The operations 900 are used in combination with a graphical user interface (GUI) displayed on the touchscreen display 210. The GUI comprises a plurality of selectable user interface elements each having an area of the touch-sensitive input surface 206 associated therewith and each generating a respective input signal in response to selection thereof, such as a virtual keyboard 334 (see FIGS. 3A and 3B) or icon selection menu 352 (see FIG. 3A), for example.

In the first step 902, the processor 240 monitors for and detects the occurrence of one or more trigger conditions for the display of content such as advertising. In some embodiments, the trigger conditions may comprise (i) a change in the screen orientation of the GUI displayed on the touchscreen display 210, (ii) a change in orientation of the device 201 itself, (iii) a change in a mode of the device 201 (e.g., when starting a new application or function, or switching between applications and functions on the handheld electronic device), or (iv) any combination thereof.

The trigger condition comprising a change in the screen orientation of the GUI displayed on the touchscreen display 210 may be a change from a portrait screen orientation in a first mode of the device 201 to a landscape screen orientation in the first mode or other mode of the device 201. Conversely, the trigger condition may be a change from a landscape screen orientation in a first mode of the device 201 to a portrait screen orientation in the first mode or other mode of the device 201. User interface screen orientations other than a portrait screen orientation and landscape screen orientation are also possible. Thus, the trigger condition could be a change from a particular one of a multiple of user interface screen orientations to a different one of the multiple user interface screen orientations.

The trigger conditions (i) and (ii) are similar in that trigger conditions both relate to orientation aspects of the mobile communication device 201; however trigger condition (i) relates to a change in the orientation of the screen orientation of the GUI whereas trigger condition (ii) relates to a change in the orientation of the mobile communication device 201 itself. Thus, the trigger conditions (i) and (ii) are not coterminous in at least some embodiments.

It will be appreciated that, depending on the device capabilities, settings and/or operational mode of the device 201, it may or may not change the user interface screen orientation of the GUI in response to changes in the orientation of the device 201. For example, some operational modes of the device 201 have only one user interface screen orientation (e.g., either a portrait or landscape user interface screen orientation) or possibly no user interface screen. The use of these two different but similar triggers may be advantageous to accommodate circumstances in which the screen orientation does not change, and to accommodate circumstances in which the screen orientation does change but does so based on factors other than a change in the orientation of the device 201. Moreover, it is possible that the device orientation (or a change in the device orientation) may be advantageous for triggering the display of content which requires a user's attention but may not be advantageous for triggering a change in the screen orientation. An example of such a change in device orientation is changing the device from a face up to a face down orientation, for example, if the user is using the device 201 while lying on his or her back.

As noted above, changes in screen orientation may or may not be triggered by device orientation. In some embodiments, screen orientation changes may be based on triggers other than changes in the orientation of the mobile communication device 201 instead of, or in addition to, automatic changes based on device orientation and/or changes in device orientation. For example, screen orientation could be changed by an application running on the device 201 (e.g., application triggered) or could be changed manually (e.g., manually triggered). A manual change in screen orientation may be triggered via a corresponding change in a respective option from an options menu in the GUI of the device 201.

It will be appreciated that other trigger conditions in addition to, or instead of, those described above could also be used. Other suitable trigger conditions include other GUI transition or mode changes of the mobile communication device 201. GUI transitions or mode changes may be effective trigger conditions since the user is typically attentive at this point either because the user has just moved the device or requested an alternate mode, function or application be used on the mobile communication device 201. Any device event associated with a high degree of user attention could be used as a trigger condition.

The start or launch of an application or function on the device 201, or switching between applications and functions on the device 201 is typically associated with a GUI transition, the transition ending with a user interface screen of the application or function which is started or switched to being displayed on the touchscreen display 210.

One example of a GUI transition or mode change which may be a trigger condition is entry into, or exiting from, a text entry mode, such a mode change/GUI transition being associated with the display of a text entry mode user interface such as a message composition window 370 (FIG. 3B) and possibly a virtual keyboard 334 if the device 201 is a touchscreen device and the virtual keyboard 334 is not already displayed on the touchscreen display 210. The display of the message composition window 370 may correspond closely in time to a change in the screen orientation in many instances, as users often read messages in the portrait screen orientation, and flip the device 201 (or otherwise change the screen orientation) to the landscape screen orientation when typing a reply message. The user is typically very attentive at this point (e.g., anxious to start typing) and so displaying content such as an advertisement at this time may increase the likelihood that the user's attention will be focussed on the display screen during the display of content (e.g., advertisement). Another example of a GUI transition or mode change which may be a trigger condition is entry into, or exiting from, an icon selection menu 352 (FIG. 3A).

Another example of a GUI transition or mode change which may be a trigger condition is the launch of, or closing of, a media player application or the start of media (e.g. audio or video) playback. As when composing a message, the start of media playback may correspond closely in time to a change in the screen orientation in many instances, as users often select media for playback in the portrait screen orientation (e.g., file or track from a playlist), and flip the device 201 (or otherwise change the screen orientation) to the landscape screen orientation during playback. Again, the user is typically very attentive at this point (e.g., anxious to review the media) and so displaying content such as an advertisement at this time may increase the likelihood that the user's attention will be focussed on the display screen during the display of content (e.g., advertisement).

The trigger condition (ii) comprising of a change in orientation of the mobile communication device 201 may comprise monitoring for and detecting changes in the orientation of the mobile communication device 201. The changes in the orientation may be determined by the processor 240 of the device 201 based on positional/orientation information from the position detection system 249, rather than by the position detection system 249 itself. Example methods of determining the orientation (position) of the device 201 using the position detection system 249 are described below.

Other examples of possible trigger conditions to trigger the display of advertisements on the touchscreen display 210 include, but are not limited to: powering the device 201 on or off; entering or exiting a locked mode of the device 201; enabling or disabling a screensaver mode of the device 201; opening or "sliding" out/down the keyboard of a slider phone; opening of a flip phone; receipt of an incoming message by the device 201 (email message, IM message, short message service (SMS) message, multimedia messaging service (MMS) message, voicemail message); display of a notification such as a reminder notification on the device 201; and receipt of an incoming phone call by the device 201.

In some embodiments in which the trigger condition is a change in device orientation, device orientation (change) event notifications are sent to the operating system 223 by either the device orientation subsystem 249 or processor 240, depending on how device orientation is determined. Corresponding notifications are then sent from the operating system 223 to the dynamic event module 228 where such notifications are processed in determining whether a trigger condition for the display of content has been detected. Upon receiving a device orientation event notification, the dynamic event module 228 determines that a trigger condition has been detected. In other embodiments, the dynamic event module 228 may be part of the operating system 223 or the active application 225.

In some embodiments in which the trigger condition is a change in screen orientation, device orientation (change) event notifications are sent to the operating system 223 by either the device orientation subsystem 249 or processor 240, depending on how device orientation is determined. Corresponding notifications are then sent from the operating system 223 to the user interface module 226 so that it can determine whether a change in the screen orientation of the GUI is required. Screen orientation (change) event notifications are sent by the user interface module 226 to the dynamic event module 228 when a change in the screen orientation of the GUI is required. These notifications are processed by the dynamic event module 228 in determining whether a trigger condition for the display of content has been detected. Upon receiving a screen orientation event notification, the dynamic event module 228 determines that a trigger condition has been detected. In other embodiments, the dynamic event module 228 may be part of the user interface module 226 (which could, in turn, be part of the operating system 223) or the active application 225.

In some embodiments in which the trigger condition is a change in the operational mode of the device 201, mode (change) event notifications are sent from the operating system 223 to the dynamic event module 228 where such notifications are processed in determining whether a trigger condition for the display of content has been detected. Upon receiving a mode event notification, the dynamic event module 228 determines that a trigger condition has been detected. In other embodiments, the dynamic event module 228 may be part of the operating system 223 or the active application 225.

Next, in step 904 the content (e.g. advertisement) to be displayed is selected in accordance with predetermined advertising parameters. The predetermined advertising parameters, in at least some embodiments, are based on user information and/or device information, and the content is selected in accordance with whether the user information and/or device information matches with one or more predetermined advertising parameters. The user information used in selecting content comprises information describing one or more attributes about the respective device user. The device information comprises information describing one or more attributes about respective mobile communication device 201. The advertisements in the advertising content database 140 may have an associated "priority list" stored in the database 140 which provides a list of advertisements, for example, based on contractual agreement between the respective mobile network service providers and advertisers. Advertisements are selected from the priority list in order upon the detection of a trigger condition. Selection starts at the top of the priority list and proceeds until the bottom of the priority list is reached. Once the bottom of the priority list is reached, processing loops back and re-starts at the top of the priority list. The priority list may be used in combination with the predetermined advertising parameters and user information and/or device information.

The user information may comprise personal information, demographic information relating to the user, location information concerning the geographic location of mobile communication device 201, or any combination of the above. The demographic information may comprise: user-defined preferences, learned preferences (for example, from past behaviour or purchases) and any other demographic information which can be attributed to the user. The demographic information is chosen to aid in the targeting of advertisements to users who will have a greater likelihood of being interested in the product, service or information being advertised. The device information may comprise the mobile network service provider associated with the device 201, device information about the technical capabilities of the device 201, the detected trigger event, or any combination of the above.

The user information and possibly device information, in compliance with privacy laws may require the consent of the device user before the advertisement or other content can be displayed on the device 201. User consent may be obtained, for example, at the time the user creates a mobile data service plan (contract) with their respective mobile data service provider or subsequently, for example, upon registering for new wireless services or subscriptions. If the user does not consent, the operations 900 will not be performed on the device 201. In some cases, layers of consent may be required in that the user may be required to consent to the display of advertisements and other content on the device 201, and may be required to consent separately to the use of user information and/or device information in selecting the advertisement or other content that can be displayed on the device 201. Thus, a user could consent to the display of advertisements but not the use or tracking of user information and/or device information for the purpose of selecting content in which case the advertisement selected would be less targeted (if based on only one of user information and device information) or untargeted (if neither user information or device information are used). A financial reward associated with advertising content, described below, may be lower if the user does not consent to the user information and/or device information, or consents to less than full use of user information and/or device information.

In some embodiments, the advertisement is selected from an advertising content database 140 maintained by or accessible to the advertising server 138 of the wireless network 101. In such cases, the mobile communication device 201 notifies the advertising server 138 when a trigger event has been detected and requests from the advertising server 138 the advertisement which is to be displayed or otherwise reproduced on the device 201. The advertising server 138, in response to the request, selects the advertisement from advertising content database 140 in accordance with predetermined advertising parameters associated with the advertisements in the advertising content database 140 and user information and/or device information provided by one or both of the mobile network service provider (also referred to as a wireless carrier) and mobile communication device 201. The advertising server 138 then sends the selected advertisement content to the mobile communication device 201. When the selection of content is based at least in part on information associated with the mobile communication device 201 and/or its respective user(s), the device 201 sends the relevant information stored on the device 201 to the advertising server 138 with the request for the advertisement.

If the advertising content database 140 is not maintained by the advertising server 138, the advertising server 138 may interface with other network elements to access the advertising content. For example, advertising content could be maintained by advertisers in a private database, in which case the advertising server 138 accesses the private databases, possibly in a secure fashion, to retrieve the advertising content.

The geographic location may be based on a GPS transceiver of the auxiliary I/O subsystems 250 of the device 201, location information provided by location services and/or presence information, triangulation from location information from base stations 108 in the wireless network 101 when connected via cellular to the WWAN 102, the location of network access points 114 when connected via Wi-Fi to the WLAN 104, or the location of the computer 117 when connected via the computer 117 using USB or Bluetooth.

Demographic information may come from shared sources such as social networking sites (such as Facebook™, MySpace™, LinkedIN™, etc.) where information about an individual is collected to use for the specific purpose of targeting of advertisements. Other shared sources of demographic information about individuals may be used, including but not limited to, those used for targeted advertising by online advertisers, for example by online search engines or other Internet sites implementing targeted advertising when selecting advertisements for sponsored links, pop-up advertisements, banner advertisements, email-based advertisements or other types of online advertisements. The demographic information could be derived, at least in part, from presence information.

The advertising server 138 may maintain statistics about the advertisements in the advertising content database 140, such as the number of times each advertisement has been reviewed or otherwise reproduced, and possibly by which users and/or devices 201 and possibly the duration of each advertisement viewed or otherwise reproduced on the device 201.

In some embodiments, the advertising server 138 may interface with a financial (reward) system (not shown) of the mobile network service provider which comprises a financial (reward) system database. The financial database may be part of the accounting database of the mobile network service provider, a shared accounting database, or a separate database. The advertising server 138 calculates a financial reward at predetermined periods, typically in accordance with the user's normal billing period for his or her mobile data service by his or her mobile network service provider.

The financial reward may be based on the number of advertisements viewed and a monetary amount associated with each advertisement viewed or otherwise reproduced, the duration of the advertisement and a monetary amount per time (e.g. cents or fractional cents per second or millisecond), the duration of a delay associated with the advertisement and a monetary amount per time (e.g. cents or fractional cents per second or millisecond), or combinations of the above. To calculate the reward in accordance, the advertising server 138 stores at least the number of advertisements displayed on the devices 201. As the rates per view, and the rates for duration and delay may differ between advertisement, it may be necessary to record the particular advertisement viewed, the number of times each was viewed, and possibly any duration and/or delay associated therewith. At the relevant time, the reward will then be calculated in accordance with the stored number of advertisements displayed on the devices 201, and possibly a time parameter comprising the duration and/or delay associated with each advertisement.

The advertising server 138 then instructs that a credit in the amount of the calculated monetary reward be posted to the financial database. The credit to the financial database will be reflected on the balance of the user's next wireless services bill (invoice), e.g. his or her monthly bill of the period in which the advertisements were viewed or otherwise reproduced, as a credit applied against the monthly changes incurred by the user in that period in accordance with the terms of the service contract with the mobile network service provider. The credit provides the user with a subsidy of his or her mobile data service in exchange for viewing advertisements. In some embodiments, at least a portion of the subsidy of the mobile data service is directly proportional to the amount of time the user has spent viewing or listening to advertisements, and possibly compensates the user for a loss of privacy if the user consents to the use of targeting advertising based on one or more of user information and device information.

The mobile network service provider may, in turn, be compensated by advertisers in accordance with the advertiser's advertisements which are viewed or otherwise reproduced, typically a premium to the financial reward given to device users. In other embodiments, rather that a credit against monthly wireless services, the user may be directly compensated by advertisers rather than his or her mobile network service provider, for example in the form of predetermined monetary amounts or predetermined value coupons. In some embodiments, rather than monetary rewards, the user may be awarded points for redemption at the user's request. The points may be part of a "points network" such as Air Miles™, or the points could be applied against wireless services provided by mobile network service provider or against products or services provided by the advertisers.

In other embodiments, the advertising server 138 communicates the number of advertisements viewed or otherwise reproduced on the device 201, possibly the duration of each advertisement viewed or otherwise reproduced on the device 201, and possibly the delay associated with each advertisement viewed or otherwise reproduced on the device 201, to a server maintained by the mobile network service provider. The mobile network service provider then calculates the financial reward, for example, using the normal accounting application of the mobile network service provider.

The advertising server 138, in some embodiments, may provide an advertiser portal (not shown) which allows advertisers to upload advertising content to the advertising content database 140. An advertiser may view statistics and information regarding the advertisement via the advertiser portal and may optionally modify advertising campaign parameters such as the predetermined advertising parameters used in selecting content for display on devices 201.

In other embodiments, the content (e.g. one or more advertisements) could be stored locally on the device 201, and the selection decision is made by the device 201 based on locally stored advertising parameter data. The advertisement could be downloaded wirelessly in advance and stored on the device 201. For example, advertising content may be pushed transparently to the device 201 in a manner which is invisible to the device user. The advertising content stored locally on the device 201 may be small compared with that maintained by or accessible to the advertising server 138 of the wireless network 101. For example, a single advertisement or a small number of advertisements may be stored on the device 201 for selecting upon the detection of a trigger condition. Alternatively, the advertising content may be downloaded in advance when connected to the user's computer 117, for example, via USB or Bluetooth. Handheld electronic devices without wireless communications capabilities can utilise USB or Bluetooth connectivity in order to apply the teachings of the present disclosure. In addition, electronic devices with and without wireless communications capabilities could have advertising content pre-loaded (installed) on the device 201, for example, upon delivery of the device 201 to its user.

Next, in step 906 the processor 240 displays the selected advertisement on the touchscreen display 210 in response to the detection of a trigger condition. The advertisement may be a video, animation, (e.g. Flash), a digital image, text document, or other multimedia format comprising visual and audio content. The advertisement typically comprises at least visual content and possibly audio content; however in other embodiments an advertisement having only audio content could be used.

The visual content is typically displayed so as to occupy the full display area of the touchscreen display 210 (i.e., full screen) thereby obscuring the user interface screen of the operating system 223 or application 225 which was previously displayed, or other visual content which would otherwise be displayed. In other embodiments, a portion of the touchscreen display 210 less than the full screen could be used. Visual content less than the full screen typically occupies a majority of the touchscreen display 210 as opposed to ticker ads or banners ads which occupy only a small portion of the display screen, and are typically limited to a designated area of the display screen. It will be appreciated that the advertisement, when displayed, may have matting which surrounds the advertising content, for example, to accommodate differences between the aspect ratios of the advertising content and the touchscreen display 210. Moreover, the advertisement may be presented within a frame or window on the touchscreen display 210 which may include user interface elements associated with a player or rendering application associated with the advertising player provided by the dynamic event module 228.

Next, in step 908 the processor 240 implements a locked mode in response to the display of the advertisement on the touchscreen display 210. The locked mode limits the inputs accepted by the user input devices (e.g. touchscreen display 210, control buttons 260, etc.) of the mobile communication device 201. This prevents usage of the device 201 until a predetermined termination condition has occurred.

Next, at step 910 the processor 240 monitors for and detects the occurrence of a predetermined termination condition to exit the locked mode and release the limits on the inputs accepted by the user input devices. In some embodiments, the termination condition is the expiry of a predetermined duration from the display of the advertisement on the display screen (e.g., until n seconds have elapsed). If the advertisement has a duration, for example when the advertisement is a video, audio clip or animation, the predetermined duration may be the duration of the advertisement itself. In some embodiments, the advertisement may be a rapid Flash advertisement of several seconds or less (e.g. 2 to 3 seconds or less).

When the advertisement does not have a duration, for example when the advertisement is a digital image or text, the predetermined duration is a predetermined value. The predetermined value may be, for example, between 5 and 10 seconds, or 5 seconds or less. Example predetermined values which could be used in some embodiments are 10 seconds, 5 seconds, 3 seconds, 2 seconds and 1 second. These example durations are long enough to provide some assurance that the user has viewed and/or heard the advertisement, but are sufficiently short such that the durations may not be considered overly intrusive by at least some users.

The duration may be configurable to user preferences, either by device settings stored on the device 201 or by settings maintained or accessible by the advertising server 138. The duration may be part of advertising parameters which are defined, for example, at the time the user creates a mobile data service plan (contract) with their respective mobile data service provider. In such cases, the duration may be stored by the mobile data service provider in a database and transmitted to the advertising server 138 as required, or the duration may be stored by the advertising server 138. Device settings stored on the device 201 may be transmitted and stored on the advertising server 138 when created or changed, or could be transmitted upon detection of a trigger condition and a request for advertisement to be displayed.

As noted above, the duration of the delay may be associated with a financial reward. That is, users may be compensated for per unit of time of the delay (e.g., per second or millisecond) so the user can benefit financially from longer delays in some cases. Thus, a user can choose the desired trade-off between the financial reward and the inconvenience of the advertisements in accordance with individual preferences. Where the user can set the duration of the delay on the device 201, the duration is transmitted back to the advertising server 138 either when the setting is first made on the device 201 or subsequently changed, or after the display of each advertisement, so that the financial reward may be calculated. In embodiments where there is no financial reward, the user may still be given the option to choose the length of the delay, if any.

In other embodiments, the termination condition is the detection of a touch at a specific area of the touch-sensitive input surface 206. The specific area of the touch-sensitive input surface 206 may be a predetermined area, or a randomly generated area determined when the advertisement is displayed on the touchscreen display 210. The use of a randomly generated area rather than a predetermined area prevents users from advancing through the advertisement without viewing any or viewing only a small portion of the advertisement by learning the location of the predetermined area and pressing that area immediately after a trigger condition and/or immediately after the advertisement is displayed.

In other embodiments, the termination condition is a predetermined combination of inputs using the input devices of the mobile communication device 201 (e.g., one or more specific inputs using the touchscreen 210 or control buttons 260). In embodiments having a mechanical keyboard, the predetermined combination of inputs may be a predetermined key combination, or could be a predetermined combination of keys and one or more specific inputs using the control buttons 260.

Next, in step 912 when the occurrence of a termination condition is detected, the locked mode is terminated and the mobile communication device 201 is returned to normal (full) functionality. That is, the limits on the inputs accepted by the user input devices are removed. The mobile communication device 201 will remain in the locked mode until a termination condition is detected. A notification that the advertisement was successfully displayed or otherwise reproduced on the device 201 may be transmitted to the advertising server 138, for example, for use in calculating the financial reward. Where a delay is the termination condition, the duration of the delay may be transmitted to the advertising server 138 for the purpose of calculating the financial reward when the duration of the delay is not already known to the advertising server 138.

While the operations 900 have been described as occurring in a particular order, it will be appreciated to persons skilled in the art that some of the steps may be performed in a different order provided that the result of the changed order of any given step will not prevent or impair the occurrence of subsequent steps. Furthermore, some of the steps described above may be combined in other embodiments, and some of the steps described above may be separated into a number of sub-steps in other embodiments. For example, the duration of the delay could be transmitted to the advertising server 138 at any time after it is known, and need not be transmitted after the device 201 is unlocked. In addition, the notification that the advertisement was successfully displayed or otherwise reproduced on the device 201 may be transmitted to the advertising server 138 at any time after it is displayed or otherwise reproduced rather than after the device 201 is unlocked.

The teachings of the present disclosure, while described primarily in the context of advertisements, could also be applied to the reproduction of content other than advertisements on the device 201, particularly content for which user attention is sought or is desirable. The content could be stored locally on the device in memory 244, locally on a removable memory card such as an SD™ or MicroSD™ card received in a removable memory card interface (not shown) of the auxiliary I/O subsystem 250, or remotely by the content server 134, for example, in a content database (not shown). In some embodiments, the content may comprise one or any combination of visual content, audio content, and audio and visual content (e.g., multimedia content). The content may comprise an electronic message (e.g., SMS, MMS, IM message, email message, etc.), audio, video, animation, (e.g. Flash), a digital image, or text document. These examples are intended to be non-limiting.

The content could be selected based on user information about the device user. The user information used in the selection of content may comprise personal information, demographic information, location information concerning the geographic location of mobile communication device 201, or any combination of the above. The demographic information may comprise: user-defined preferences, learned preferences (for example, from past behaviour or purchases) and any other demographic information which can be attributed to the user.

The content could be selected from a personal media library/collection on the device 201 or content server 134. The personal media collection may comprise one or any combination of digital images, audio and video. The personal media collection may comprise one or any combination of favourite digital images (e.g., family photos, vacation photos, etc.), favourite audio (e.g., favourite songs), and favourite video (e.g. favourite video clips). Favourites may be stored in one or more predetermined media databases (which, in some embodiments, could comprise a separate media database for each media type, e.g. audio, video and digital images) and may be identified as a favourite by its location in a predetermined media database, or may be identified based on a favourite flag associated with the respective media content. The content could be selected from the personal media collection: (i) randomly; or (ii) based on user information about the device user. Thus, in some embodiments the detection of a trigger condition could cause the display of a favourite digital image, favourite song, or favourite video clip. A user configurable device settings or server settings may be provided which allow the device user to select the type of media, whether it is limited to favourites, and/or the basis for selection (e.g. random or based on user information).

In addition to or instead of the foregoing criteria, the content may be selected based on user information about a person with whom the device user is communicating (e.g., via a telephone call, chat, or other communication session) or user information about a person with whom the device user is attempting to initiate communications with, for example a person with whom the device user is composing an electronic message (e.g., SMS, MMS, IM message, email message, etc.). Information about the person with whom the device user is communicating or attempting to initiate communications with can only be used in some instances, that is, when an indication of the person with whom the device user is communicating or attempting to communicate with is available. Typically, this is indentifying information about the person (e.g., name, phone number, email address, IM name or other identifier) but could be a hint about the identity of the person. For example, information from an active voice call or an electronic communication (e.g., message) being viewed/displayed on the device 201 may be used to identify the person whom the user is communicating (e.g., an email being read by the device user). An email address or other contact identifier in an address field (e.g., "To" field) of a message composition window (for email, IM or other electronic messages) may be used to identify the person whom the user is communicating, or may be used to identify the person with whom the device user is attempting to initiate communications with. The information about the identified person used in the selection of content may comprise personal information, demographic information, location information concerning the geographic location of the person, the current date and a date associated with personal information (such as birthdays and anniversaries), or any combination of the above.

Thus, in some embodiments the detection of a trigger condition could cause the display of information concerning the person with whom the device user is communicating or attempting to initiate communications with, such as a birthday, family information, or other personal information on the display screen of the device 201. The display of personal information may allow, for example, the device user to provide a personal message to the person with whom they are speaking to on the telephone, or to compose a more personal message.

In other embodiments, the content could be notifications. The notifications could be device notifications relating to the device such as a low battery, loss of connection with the wireless network 101, device hardware failure, identification of a device hardware defect, a "general" emergency such as the occurrence of a natural disaster or other local emergency such as a transit strike or other suspension of transit services, a reminder notification relating to calendar events or other electronic events, or a notification relating to the receipt of a new electronic message (e.g., an email message, an SMS or text message, MMS message, IM message, voicemail messages, etc.) from one of the applications 225 on the device 201.

Device Orientation Determination

Figure 8A:
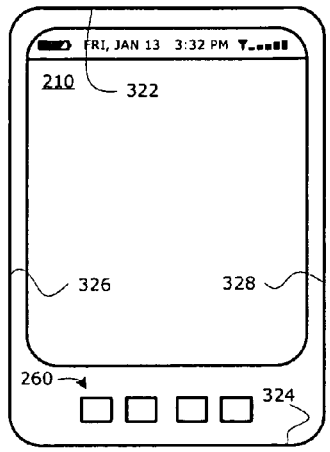
FIG. 8A to 8F illustrate six (6) device orientations recognized by an device orientation subsystem of the handheld electronic device in accordance with one example embodiment of the present disclosure.
Figure 8B:
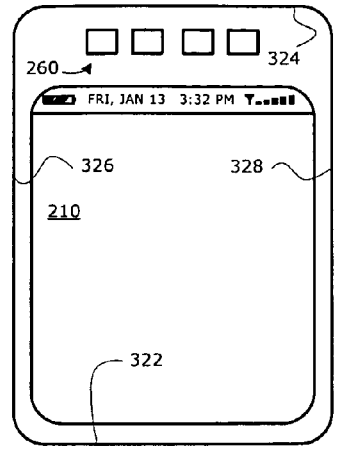
Figure 8C:
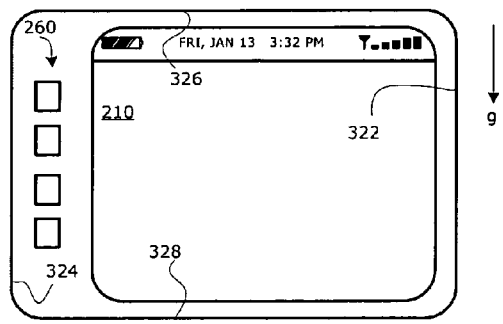
Figure 8D:
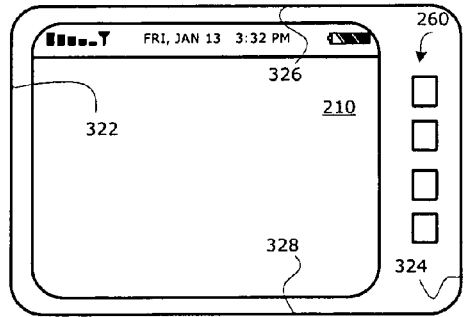
Figure 8E:
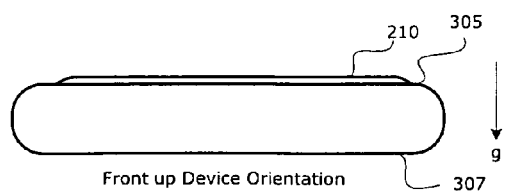
Figure 8F:
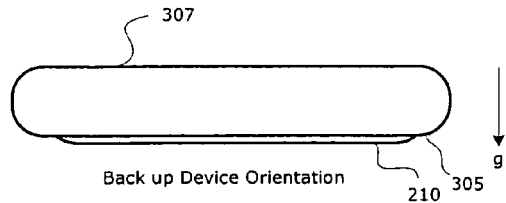

Referring now to FIG. 8A to 8F, predefined device orientations detected by the device orientation subsystem 249 in some embodiments of the present disclosure will be described. The device orientation subsystem 249 or processor 240, depending on the embodiment, uses measurements of the device orientation subsystem 249 (e.g., the accelerometer 510) to determine the device orientation to be one of six possible device orientations comprising: (1) a "top up" device orientation (as shown in FIG. 8A); (2) a "bottom up" device orientation (as shown in FIG. 8B); (3) a "left up" device orientation (as shown in FIG. 8C); (4) a "right up" device orientation (as shown in FIG. 8D); (5) a "front up" (or "face up") device orientation (as shown in FIG. 8E); and (6) a "back up" device orientation (as shown in FIG. 8F). Other device orientations are possible and could be used in other embodiments.

It will be appreciated that the predefined device orientations are defined by which particular one of the top 322, bottom 324, left-hand side 326, right-hand side 328, front face 305, and back face 307 of the device 201 is directed generally upwards. Moreover, it will be appreciated that the device 201 need not be orientated precisely in one the illustrated device orientations for the determination of the device orientation. Instead, the predefined device orientations act as reference positions. The device orientation is determined by selecting the reference position (e.g., which of the six predefined device orientations shown in FIG. 8A to 8F) is closest to the actual device orientation. Each of the predefined device orientations may be mapped to orientation values measured by the orientation sensor or derived from its measurements in order to determine the reference position which is closest to the actual device orientation. The orientation values may be used to construct an orientation profile of each of the six predefined device orientations. The orientation values which are mapped to the predefined device orientations, in some embodiments, may be defined, directly or indirectly, in terms of pitch ($\phi$), roll ($\rho$) and the angle of the z-axis relative to gravity ($\theta$) measured by a three-axis accelerometer, which may calculated using equations (3), (4) and (5) described above.

In some embodiments in which the touchscreen display 210 is rectangular in shape, the processor 240, in some operational modes, may change the screen orientation of the GUI to a landscape screen orientation when the mobile communication device 201 is (re)positioned in a generally horizontal direction in accordance with the instructions of the user interface module 226, and may change the screen orientation of the GUI to a portrait screen orientation when the mobile communication device 201 is (re)positioned in a generally vertical direction in accordance with the instructions of the user interface module 226. The processor 240 may invert or "flip" the screen orientation of the GUI horizontally or vertically if the mobile communication device 201 is flipped horizontally or vertically. In other operational modes of the processor 240 or in other embodiments, the screen orientation may be fixed.

Referring again to the FIG. 8A to 8F, in some embodiments the screen orientation of the GUI is selected in accordance with mappings of screen orientation to device orientation as set forth below in Table 1 (subject to application overrides as described below):

TABLE 1

Device Orientation vs. Screen Orientation

| Device Orientation | Screen Orientation |
| --- | --- |
| "top up" device orientation (FIG. 8A) | portrait (up) screen orientation |
| "bottom up" device orientation (FIG. 8B) | portrait (down) screen orientation |
| "left up" device orientation (FIG. 8C) | landscape (left) screen orientation |
| "right up" device orientation (FIG. 8D) | landscape (right) screen orientation |
| "front up" device orientation (FIG. 8E) | default/previous screen orientation |
| "back up" device orientation (FIG. 8F) | default/previous screen orientation (or display screen disabled/off) |

Having regard to the above-described screen orientations (also referred to as aspect ratios), it will be appreciated that the screen orientation is portrait in both the "top up" and "bottom up" device orientations shown in FIG. 8A and FIG. 8B, respectively, and that the screen orientation is landscape in both the "left up" and "right up" device orientations shown in FIG. 8C and FIG. 8D, respectively. To differentiate between the variants of the portrait screen orientation in the "top up" and "bottom up" device orientations and landscape screen orientation in the "left up" and "right up" device orientations, a direction of the screen orientation is defined. The direction is relative to a fixed position on the device 201, which is the top 322 of the device 201 in the present embodiment. A different directional reference could be used in other embodiments. Thus, the screen orientation in the "top up" device orientation (FIG. 8A) is the portrait (up) screen orientation because the top 322 of the device 201 is directed upwards relative to the ground and force of gravity. The screen orientation in the "bottom up" device orientation (FIG. 8B) is the portrait (down) screen orientation because the top 322 of the device 201 is directed downwards relative to the ground and force of gravity. Otherwise stated, in the "bottom up" device orientation of FIG. 8B, the bottom 324 of the device 201 is directed upwards relative to the ground and force of gravity.

The screen orientation in the "left up" device orientation (FIG. 8C) is landscape (left) screen orientation because the top 322 of the device 201 is rotated in the vertical plane towards the left side 326 of the device 201. The screen orientation in the "right up" device orientation (FIG. 8D) is landscape (right) screen orientation because the top 322 of the device 201 is rotated in the vertical plane towards the right side 328 of the device 201.

In some embodiments, the "front up" (FIG. 8E) and "back up" (FIG. 8F) device orientations are not associated with a particular screen orientation, except for a default screen orientation. The default screen orientation is typically the portrait (up) orientation of the "top up" device orientation as this is typically considered the "normal" operating position of the device 201. In the "front up" and "back up" device orientations, the screen orientation is the previous screen orientation of the device 201 when it was last in the "top up", "bottom up", "left up" or "right up" device orientation. The previous screen orientation of the device 201 is stored in memory 244 by the user interface module 226.

As described in more detail below, some of the applications 225 may have a screen orientation of the GUI which varies in accordance with the orientation of the device 201; however, one or more of the applications 225, such as the phone application, may have a fixed screen orientation which is unaffected by the device orientation.

FIG. 3A illustrates a portrait screen orientation of a virtual keyboard 334 implemented by a virtual keyboard module 229 in an input mode of the device 201. The virtual keyboard 334 comprises a plurality of virtual keys or buttons, identified individually by reference numerals 336, 338, 340, 342, 344, 346 for user input of displayable characters (alphanumeric characters or symbols such as pound and asterisk) and/or causing the processor 240 to perform an action such as an executable function or command by touching the region or portion of the touchscreen 210 in which the virtual keys are displayed.

In the portrait screen orientation, the virtual keyboard 334 is displayed between the left and right sides 326, 328 of the device 201 in the lower portion of the touch-sensitive input surface 206 towards the bottom 324 of the device 201. A virtual keyboard 334 in a portrait screen orientation scrolls horizontally across the face 305 of the device 201 in the same general direction as its width. In other embodiments, the virtual keyboard 334 may be located elsewhere (e.g. towards the top of touch-sensitive input surface 206) and may occupy a larger or smaller portion of the touchscreen 210 than that shown in FIG. 3A. In some embodiments, the virtual keyboard 334 in the portrait screen orientation may occupy a majority of the touch-sensitive input surface 206 of touchscreen 210.

FIG. 3B illustrates a landscape screen orientation of the virtual keyboard 334 in which the virtual keyboard 334 is displayed between the top and bottom 322, 324 of the device 201. A virtual keyboard 334 in the landscape screen orientation scrolls horizontally across the face 305 of the device 201 in the same general direction as its length. In other embodiments, the virtual keyboard 334 may be located elsewhere on the touchscreen 210 and may occupy a larger or smaller portion of the touchscreen 210 than that shown in FIG. 3B. In some embodiments, the virtual keyboard 334 in the landscape screen orientation may occupy a majority of the touchscreen 210.

In both the portrait screen orientation and landscape screen orientation in the shown embodiments, the virtual keyboard 334 is located in a lower portion of the GUI relative to the screen orientation (and typically the current device orientation) so that it may be more easily touched (or actuated) using the thumbs or other fingers of the user while the user is holding the device 201. In some embodiments, the device components may be configured and dimensioned so that user may hold the device 201 in such a manner to enable two-thumb typing on the virtual keyboard 334 of the device 201 (typically using both hands). In other embodiments, the device components may be configured and dimensioned so that the device 201 can be cradled in the palm of a user's hand and the virtual keyboard 334 may be touch with the thumb of the hand of the user in which the device 201 is being held. A user may use a stylus instead of fingers (e.g., thumbs) if desired. It will be appreciated that, if a capacitive touchscreen is used, fingers or a conductive device (such as a stylus having a conductive tip) should be used to register a touch input.

In the example embodiments illustrated in FIGS. 3A and 3B, the virtual keyboard 334 comprises a plurality of substantially similarly sized alphanumeric keys or buttons 336 and a larger elongated space bar key or button 338. The alphanumeric keys 336 are arranged in a plurality of rows across the touchscreen 210 with the elongate space bar key 338 located centrally below the last row of alphanumeric keys 336. In an example embodiment, at least one of the virtual keys 336 has one or more displayable character associated therewith. The virtual keyboard 334 also comprises non-alphanumeric command and/or control buttons or keys, such as a line feed or "ENTER" key 340, a "CAP" key 342 for capitalizing letters, an "ALT" key 344 for selecting an alternative input or command, and a "BACKSPACE" key 346 which backs up the cursor when the device is in a text input mode and removes the previous character input. Additional virtual control keys such as "SHIFT" and "CTRL" keys may be provided in other embodiments. Alternatively, one or more mechanical control keys may be provided to invoke the secondary or alternate input of the virtual keys 336. The mechanical control keys could be the "SHIFT" and/or "CTRL" keys, or possibly an "ALT" key replaying that in the virtual keyboard 334 of the illustrated embodiment. The control buttons or keys can be pressed (pressed once or continually pressed down, depending on the key and device configuration) to provide an alternative input of the keys 336 or other input component when pressed. As will be appreciated by those skilled in the art, keys that give alternative meaning to other input components enable expanded input capability.

The virtual keyboard 334 may also comprise one or more specialized keys (not shown) such as a menu key which invokes context-sensitive menus comprising a list of context-sensitive options, a back key which cancels action or reverses ("backs up") through previous user interface screens or menus displayed on the touchscreen 210, a hang up key to end a voice call, and/or an answer key to answer an incoming voice call.

In the above described embodiments, the virtual keyboard 334 comprises a full keyboard comprising a plurality of keys 336 each having an alphabetic letter associated with the key on one letter per key basis. This one-to-one pairing between letters and keys will be understood to persons of ordinary skill in the art and will not be described in detail herein. In order to facilitate user input, the alphabetic letters are typically configured in a familiar QWERTY, QWERTZ, AZERTY, or Dvorak layout known in the art. In other embodiments, a reduced keyboard is provided comprising a plurality of keys 336 each having an alphabetic letter associated with the key on multiple letter per key basis.

While example virtual keyboard layouts and configurations have been described, it will be appreciated by persons skilled in the art that alternative full or reduced keyboard layouts and configurations may be used in other embodiments of device 201.

In the device screen of FIG. 3A, the GUI also provides within the touchscreen 210 a status bar 350 and icon selection menu 352. The status bar 350 displays information such as the current date and time, icon-based notifications, device status and/or device state. The icon selection menu 352 displays a plurality of pictorial icon menu items (icons) 354. The icon selection menu 352 provides the device user with choices of applications or functions that may be run on the mobile communication device 201. The icon menu items 354 are each selectable to link to, or launch, an associated application or function, or open an associated folder. The icon menu items 354 may, for example, be used to select an email manager application, a calendar application, a note pad application, or other application. The user can select an application to be launched by highlighting or focusing the icon menu item 354 associated with the respective application through movement of an on-screen position indicator 356 commonly referred to as a caret or cursor. The—on-screen position indicator 356 may be moved through the icon menu items 354 using navigational inputs via the touchscreen 210 or a supplemental navigation tool such as a clickable/depressible scroll wheel or trackball (for example, by rotating a scroll wheel or trackball). When an icon menu item 354 is highlighted or focussed by the on-screen indicator 356, the focussed item 354 may be activated or "selected" via corresponding selecting input via the touchscreen 210 or other input. If the icon menu item 354 represents an application, activating the menu icon item 354 causes the processor 240 to launch the application logically associated with the icon 354, for example, the email manager application. As will be appreciated by persons skilled in the art, the activation input is translated by the GUI into a request to launch or invoke the application or function, or open the folder associated with the icon 354.

In the device screen of FIG. 3B, a text entry mode user interface frame or window 370 is displayed above the virtual keyboard 334. The text entry mode user interface window 370 comprises a number of navigable and editable input fields and is used in a text input or entry mode. Several device applications 225 typically have an associated text entry mode such as, for example, email messaging applications, instant messaging applications, task list applications, calendar applications and notepad applications. In the shown embodiment, the window 370 is a message composition window associated with an email messaging application. The message composition window 370 comprises a header portion 372 including an address field (e.g., "To" field) and a subject field, and a body portion 376. The text entry mode user interface of the window 370 includes a cursor or on-screen position indicator 356 which provides visual feedback as to the current input location (e.g., current field and possibly current location in the respective field depending on the current field).

The teachings of the present disclosure, while described primarily in the context of mobile communication devices, can be applied to electronic devices with and without wireless communications capabilities. For electronic devices without wireless communications capabilities, the content to be displayed must be stored on the device. In addition, while the teachings of the present disclosure have been described primarily in the context of touchscreen-based handheld electronic devices, in other embodiments the teachings of the present disclosure could be applied to electronic devices which have a mechanical keyboard, or both a touchscreen display and mechanical keyboard.

While the present disclosure is primarily described in terms of methods, a person of ordinary skill in the art will understand that the present disclosure is also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present disclosure.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method of triggering the display of content on a display screen of a handheld electronic device, the method comprising:
monitoring for the occurrence of trigger conditions comprising one or more of:
changes in orientation of the handheld electronic device, changes in a screen orientation of a graphical user interface (GUI) displayed on the display screen, or monitoring for the sliding out of a keyboard on the handheld electronic device which is slide-ably connected to a housing which houses the display screen;
reproducing content on the handheld electronic device in response to detection of one of the trigger conditions, the content selected in accordance with content parameters and information from a social networking site about a user associated with the handheld electronic device, the content comprising at least one favorite personal media from a personal media library associated with the user and the at least one favorite personal media designated as a favorite by the user; and
implementing a locked mode on the handheld electronic device in response to the reproducing of the content, the locked mode limiting inputs accepted by user input devices of the handheld electronic device.

2. The method of claim 1, wherein reproducing content comprises displaying an advertisement on the display screen of the handheld electronic device in response to the detection of one of the trigger conditions.

3. The method of claim 2, further comprising:
monitoring after the locked mode is implemented for a predetermined termination condition; and
releasing the locked mode in response to detection of the predetermined termination condition.

4. The method of claim 3, wherein the predetermined termination condition is the expiry of a predetermined duration from the display of the advertisement on the display screen.

5. The method of claim 4, wherein the predetermined duration is a duration of the advertisement.

6. The method of claim 3, wherein the display screen is a touchscreen display screen having a touch-sensitive input surface, and the predetermined termination condition comprises detection of a touch event at a specific area of the touch-sensitive input surface.

7. The method of claim 6, wherein the specific area of the touch-sensitive input surface is a predetermined area or a randomly generated area determined when the advertisement is displayed on the display screen.

8. The method of claim 1, wherein the personal media library is stored on the handheld electronic device or a server.

9. The method of claim 1, wherein the at least one favorite personal media is identified as the favorite by its location in a media database.

10. The method of claim 1, wherein the at least one favorite personal media is identified as the favorite by a favorite flag associated with the at least one favorite personal media.

11. The method of claim 2, wherein the trigger condition is input to commence playback of media in a media player mode of the handheld electronic device, input to commence a text entry mode of the handheld electronic device, or a change in the screen orientation of the GUI from one of a portrait screen orientation and landscape screen orientation to the other of the portrait screen orientation and landscape screen orientation.

12. The method of claim 2, wherein the trigger condition is a change in orientation of the handheld electronic device, the method further comprising determining the orientation of the handheld electronic device.

13. The method of claim 2, wherein the handheld electronic device is a mobile communication device configured to connect to a wireless data network, the method further comprising:
requesting the advertisement for display from an advertising server over the wireless data network; and
receiving the advertisement from the advertising server over the wireless data network, the advertisement being selected by the advertising server based on predetermined advertising parameters.

14. The method of claim 2, further comprising:
storing at least a number of advertisements displayed on the handheld electronic device;
calculating a reward in accordance with the number of advertisements displayed on the handheld electronic device; and
posting a credit to a financial reward system in accordance with the calculated reward.

15. The method of claim 14, wherein a time parameter comprising a duration of the advertisement or a delay associated with each advertisement is stored in association with the number of advertisements displayed, the reward being calculated in accordance with the number of advertisements displayed on the handheld electronic device and the time parameter.

16. A handheld electronic device, comprising:
a controller for controlling the operation of the device;
one or more input devices connected to the controller;
a display screen connected to the controller;
a housing which houses the display screen; and
the controller being configured to: (i) monitor for the occurrence of trigger conditions comprising one or more of:
changes in orientation of the handheld electronic device, changes in a screen orientation of a graphical user interface (GUI) displayed on the display screen, or sliding out of a keyboard on the handheld electronic device which is slide-ably connected to the housing; and (ii) reproduce content on the handheld electronic device in response to detection of one of the trigger conditions, wherein the content was is selected in accordance with content parameters and information from a social networking site about a user associated with the handheld electronic device, and wherein the content comprises at least one favorite personal media from a personal media library associated with the user and the at least one favorite personal media designated as a favorite by the user.

17. The handheld electronic device of claim 16, wherein the at least one favorite personal media comprises an image an audio or a video.

18. The handheld electronic device of claim 17, wherein the controller is configured to:
(iii) implement a locked mode on the handheld electronic device in response to the reproducing of the content, the locked mode limiting inputs accepted by the one or more user input devices, (iv) monitor after the locked mode is implemented for a predetermined termination condition; and (v) release the locked mode in response to detection of the predetermined termination condition.

19. The handheld electronic device of claim 18, wherein the display screen comprises a touchscreen display connected to the controller and having a touch-sensitive input surface which generates a touch signal in response to external force applied to the touch-sensitive input surface, wherein the touch signal is indicative of a location on the touch-sensitive input surface to which the external force was applied; wherein the predetermined termination condition is the detection of a touch event at a specific area of the touch-sensitive input surface.

20. The handheld electronic device of claim 16, further comprising a position detection subsystem comprising a positional sensor connected to the controller which generates positional signals representing an orientation of the device; wherein the trigger condition is a change in orientation of the handheld electronic device; the controller being further configured to: determine the orientation of the handheld electronic device.

* * * * *

UNITED STATES PATENT AND TRADEMARK OFFICE
CERTIFICATE OF CORRECTION

| | | |
|---|---|---|
| PATENT NO. | : 8,850,365 B2 | Page 1 of 1 |
| APPLICATION NO. | : 12/394136 | |
| DATED | : September 30, 2014 | |
| INVENTOR(S) | : Cumming | |

It is certified that error appears in the above-identified patent and that said Letters Patent is hereby corrected as shown below:

In the Claims

Column 32, line 23, Claim 16, before "is", delete "was", therefor

Column 32, line 32, Claim 17, after "image", insert --,--, therefor

Column 32, line 33, Claim 17, after "audio", insert --,--, therefor

Signed and Sealed this
Thirty-first Day of March, 2015

Michelle K. Lee
*Director of the United States Patent and Trademark Office*